US012632642B2

(12) United States Patent
Lee

(10) Patent No.: US 12,632,642 B2
(45) Date of Patent: May 19, 2026

(54) ELECTRONIC DEVICE FOR DISPLAYING AND MODIFYING IMAGES, AND CONTROL METHOD

(71) Applicant: SAMSUNG ELECTRONICS CO., LTD., Suwon-si (KR)

(72) Inventor: Jihoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 18/098,478

(22) Filed: Jan. 18, 2023

(65) Prior Publication Data

US 2023/0153517 A1 May 18, 2023

Related U.S. Application Data

(63) Continuation of application No. PCT/KR2021/007202, filed on Jun. 9, 2021.

(30) Foreign Application Priority Data

Jul. 24, 2020 (KR) ........................ 10-2020-0092362

(51) Int. Cl.
G06V 20/62 (2022.01)
G06F 3/04883 (2022.01)
(Continued)

(52) U.S. Cl.
CPC ........ G06F 40/166 (2020.01); G06F 3/04883 (2013.01); G06F 3/167 (2013.01);
(Continued)

(58) Field of Classification Search
None
See application file for complete search history.

(56) References Cited

U.S. PATENT DOCUMENTS 8,639,032 B1 * 1/2014 Voorhees ............... G06V 20/49
382/187
10,223,928 B2 3/2019 Nakatsu
(Continued)

FOREIGN PATENT DOCUMENTS

JP 2003-241630 A 8/2003
JP 2019-128850 A 8/2019
(Continued)

OTHER PUBLICATIONS

International Search Report (PCT/ISA/210) issued Sep. 17, 2021 by the International Searching Authority in International Patent Application No. PCT/KR2021/007202.
(Continued)

*Primary Examiner* — Tuyetlien T Tran
*Assistant Examiner* — Samuel Shen
(74) *Attorney, Agent, or Firm* — Sughrue Mion, PLLC

(57) ABSTRACT

A control method for an electronic device includes displaying a video in a first area of a display; identifying a writing area, including at least one piece of writing information, from the video displayed in the first area; acquiring a first image corresponding to the identified writing area, so as to display the first image in a second area of the display; based on a change being detected in the at least one writing information, identifying a type of the change; and acquiring a second image formed by correcting a first image based on the type of the identified change, so as to display the second image in the second area.

12 Claims, 21 Drawing Sheets

(51) Int. Cl.

| | | |
|---|---|---|
| *G06F 3/16* | (2006.01) |
| *G06F 40/166* | (2020.01) |
| *G06F 40/40* | (2020.01) |
| *G10L 25/57* | (2013.01) |
| *G09B 5/06* | (2006.01) |

(52) U.S. Cl.

CPC ............ *G06F 40/40* (2020.01); *G06V 20/635* (2022.01); *G10L 25/57* (2013.01); *G06F 2203/04803* (2013.01); *G09B 5/065* (2013.01)

(56) References Cited

U.S. PATENT DOCUMENTS

| | | | | |
|---|---|---|---|---|
| 11,003,839 | B1 * | 5/2021 | Hatch | .................. G06F 40/166 |
| 11,397,506 | B2 | 7/2022 | Takanashi | |
| 2003/0124502 | A1 * | 7/2003 | Chou | ...................... G09B 5/00 |
| | | | | 434/350 |
| 2015/0106098 | A1 * | 4/2015 | Inutsuka | ................. G10L 15/26 |
| | | | | 704/246 |
| 2017/0255446 | A1 * | 9/2017 | Malatesha | ............. G06F 3/0488 |
| 2017/0285930 | A1 * | 10/2017 | Sykes | .................. G06V 30/387 |
| 2018/0032494 | A1 * | 2/2018 | Charles | ................. G06V 30/153 |
| 2018/0350121 | A1 * | 12/2018 | Samuel | ............... G06F 3/04883 |
| 2021/0004136 | A1 * | 1/2021 | Takanashi | ........... G06F 3/04845 |

FOREIGN PATENT DOCUMENTS

| | | | | | |
|---|---|---|---|---|---|
| JP | 2019-212000 | A | 12/2019 | | |
| KR | 10-1999-0074180 | A | 10/1999 | | |
| KR | 10-0386842 | B1 | 6/2003 | | |
| KR | 10-0395883 | B1 | 8/2003 | | |
| KR | 10-2007-0005761 | A | 1/2007 | | |
| KR | 20070005761 | A * | 1/2007 | .............. | G09B 5/08 |
| KR | 10-2012-0101206 | A | 9/2012 | | |
| KR | 10-2013-0087871 | A | 8/2013 | | |
| KR | 10-2015-0000595 | A | 1/2015 | | |
| KR | 10-2016-0058433 | A | 5/2016 | | |
| KR | 10-1843133 | B1 | 5/2018 | | |
| KR | 10-1928524 | B1 | 12/2018 | | |
| WO | 02/44830 | A2 | 6/2002 | | |

OTHER PUBLICATIONS

Written Opinion (PCT/ISA/237) issued Sep. 17, 2021 by the International Searching Authority in International Patent Application No. PCT/KR2021/007202.

"Mega Study Smart Learning", 2022, megastudyEdu Co., Ltd, 8 pages total, https://play.google.com/store/apps/details?id=net.megastudy.smartplay.main&hl=ko.

Communication dated Jan. 6, 2025 issued by the Korean Intellectual Property Office in Korean Patent Application No. 10-2020-0092362.

* cited by examiner

FIG. 1

ELECTRONIC DEVICE FOR DISPLAYING AND MODIFYING IMAGES, AND CONTROL METHOD

CROSS-REFERENCE TO RELATED APPLICATIONS

This application is a bypass continuation application of International Application No. PCT/KR2021/007202, filed on Jun. 9, 2021, which is based on and claims priority to Korean Patent Application No. 10-2020-0092362, filed on Jul. 24, 2020, in the Korean Intellectual Property Office, the disclosures of which are incorporated by reference herein in their entireties.

BACKGROUND

1. Field

The disclosure relates to an electronic device and a control method therefor, and more particularly, to an electronic device for automatically recording writing information in a video, and a control method therefor.

2. Description of Related Art

Various e-learning technologies have been developed in accordance with the development of electronic technology. "E-learning" refers to learning performed based on an electronic environment, and a learner may perform self-directed learning activities in the Internet environment without time and space restrictions by the e-learning technology.

However, the e-learning technology of the related art focuses on a method of playing a video content in a user device. In addition, the related art only provides the e-learning technology for displaying the video in a partial area of a display screen and providing a user interface (UI) displaying a video list and the like in the other area.

In a service using the e-learning technology of the related art, the learner watching a video lecture needs to take notes of an instructor's writing in the video in a notebook or the like, which results in user inconvenience in performing the learning. For example, the learner concentrated on taking notes of the writing may miss some of a lecture, or need to pause the video to take the notes.

Therefore, there is an increasing need for technology for automatically recording a content of the writing in the e-learning video.

SUMMARY

Provided are an electronic device providing an image corresponding to writing information in a video, and a control method thereof.

In accordance with an aspect of the disclosure, a control method for an electronic device includes: displaying a video in a first area of a display; identifying a writing area including at least one writing information in the video displayed in the first area; acquiring a first image corresponding to the identified writing area and displaying the first image in a second area of the display; based on a change being detected in the at least one writing information, identifying a type of the change; and acquiring a second image in which the first image is modified based on the identified type of the change, and displaying the second image in the second area.

The detected change may be a change of deleting at least a part of the writing information and adding new writing information to an area that includes the deleted writing information, and the type of the change may include at least one of a change to correct a typographical error, a change to explain a changed content, and a change to secure a writing area.

The identifying of the type of the change may include: identifying at least one of voice data and subtitle data, corresponding to the changed writing information; and identifying the type of the change based on at least one of the identified voice data or subtitle data, and at least one of a maintenance period of the deleted writing information and a size of an area corresponding to the changed writing information.

The acquiring of the second image and displaying the second image in the second area may further include generating the second image by replacing the writing information deleted from the first image with the added writing information based on the type of the change being identified as the change to correct a typographical error.

The acquiring of the second image and displaying the second image in the second area may further include generating the second image including the writing information deleted from the first image, an indicator indicating the deleted writing information, and the added writing information based on the type of the change being identified as the change to explain a changed content.

The acquiring of the second image and displaying the same in the second area may further include generating the second image including the first image and the added writing information based on the type of the change being identified as the change to secure a writing area.

The acquiring of the second image and displaying the second image in the second area may further include: displaying the second image in a third area for handwriting recommendation while displaying the first image in the second area; and changing the first image displayed in the second area to the second image and displaying the second image based on a user input for including the second image in the second area.

The identifying of the writing area may include identifying a first sub-writing area and a second sub-writing area in the writing area, and wherein the acquiring of the first image and displaying the first image in the second area of the display may include sequentially displaying a first sub image corresponding to the first sub-writing area and a second sub image corresponding to the second sub-writing area, in the second area.

The acquiring of the first image and displaying the first image in the second area of the display may further include: displaying the first sub image and the second sub image in a third area for handwriting recommendation; and displaying an image selected from the first sub image and the second sub image in the second area.

The method may include performing a drawing function based on a user input based on the user input for drawing being detected on the second image displayed in the second area.

In accordance with an aspect of the disclosure, an electronic device includes: a memory configured to store at least one instruction; a display; and a processor configured to control the electronic device by executing at least one instruction stored in the memory, wherein the processor may be further configured to: control the display to display a video in a first area of the display, identify a writing area including at least one writing information in the video displayed in the first area, acquire a first image correspond-ing to the identified writing area and control the display to display the first image in a second area of the display, based on detecting a change in the at least one writing information, identify a type of the change, and acquire a second image in which the first image is modified based on the identified type of the change and control the display to display the second image in the second area.

The detected change may be a change of deleting at least a part of the writing information and adding new writing information to an area that includes the deleted writing information, and the type of the change may include at least one of a change to correct a typographical error, a change to explain a changed content, and a change to secure a writing area.

The processor may be further configured to identify at least one of voice data and subtitle data, corresponding to the changed writing information, and identify the type of the change based on at least one of the identified voice data or subtitle data, and at least one of a maintenance period of the deleted writing information and a size of an area correspond-ing to the changed writing information.

The processor may be further configured to generate the second image by replacing the writing information deleted from the first image with the added writing information based on identifying the type of the change as the change to correct a typographical error.

The processor may be further configured to generate the second image including the writing information deleted from the first image, an indicator indicating the deleted writing information, and the added writing information based on identifying the type of the change as the change to explain a changed content.

According to various embodiments, the electronic device may provide a user convenience function by providing the image corresponding to the writing information included in the video.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1 is a block diagram illustrating a configuration of an electronic device according to an embodiment;

DETAILED DESCRIPTION

Figure 2A:
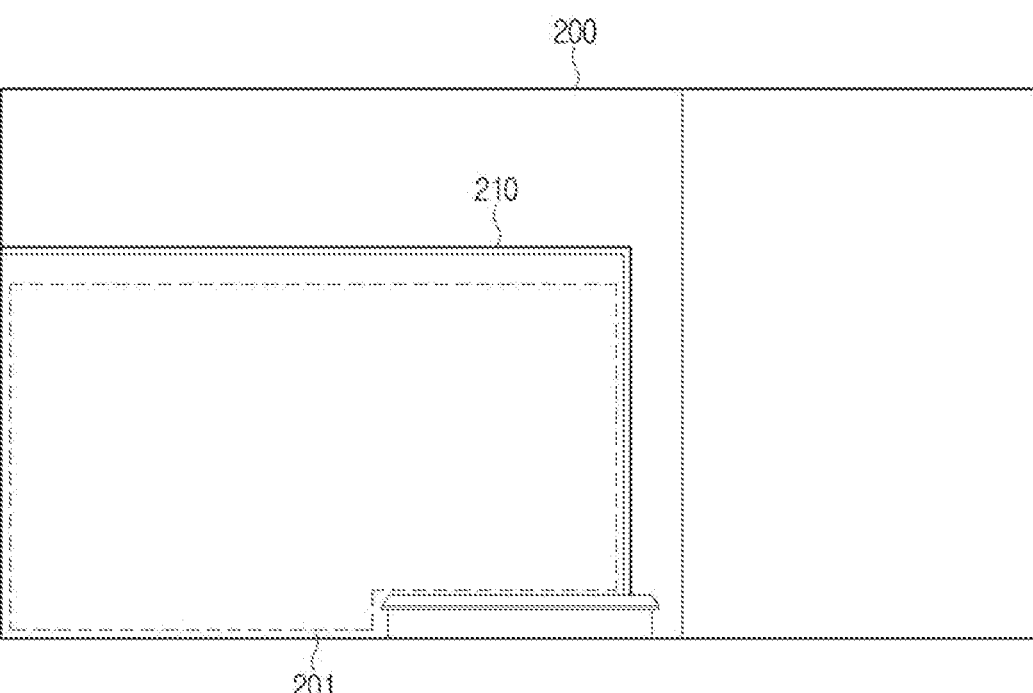
FIG. 2A is a view illustrating a writing area in a video according to the present disclosure.

The embodiments described below do not represent all technical aspects of the disclosure. It should be understood that various equivalents or variations that may be substituted for them at the time of the present application belong to the scope of rights of the disclosure.

Hereinafter, embodiments will be described in detail with reference to the accompanying drawings.

Figure 1:
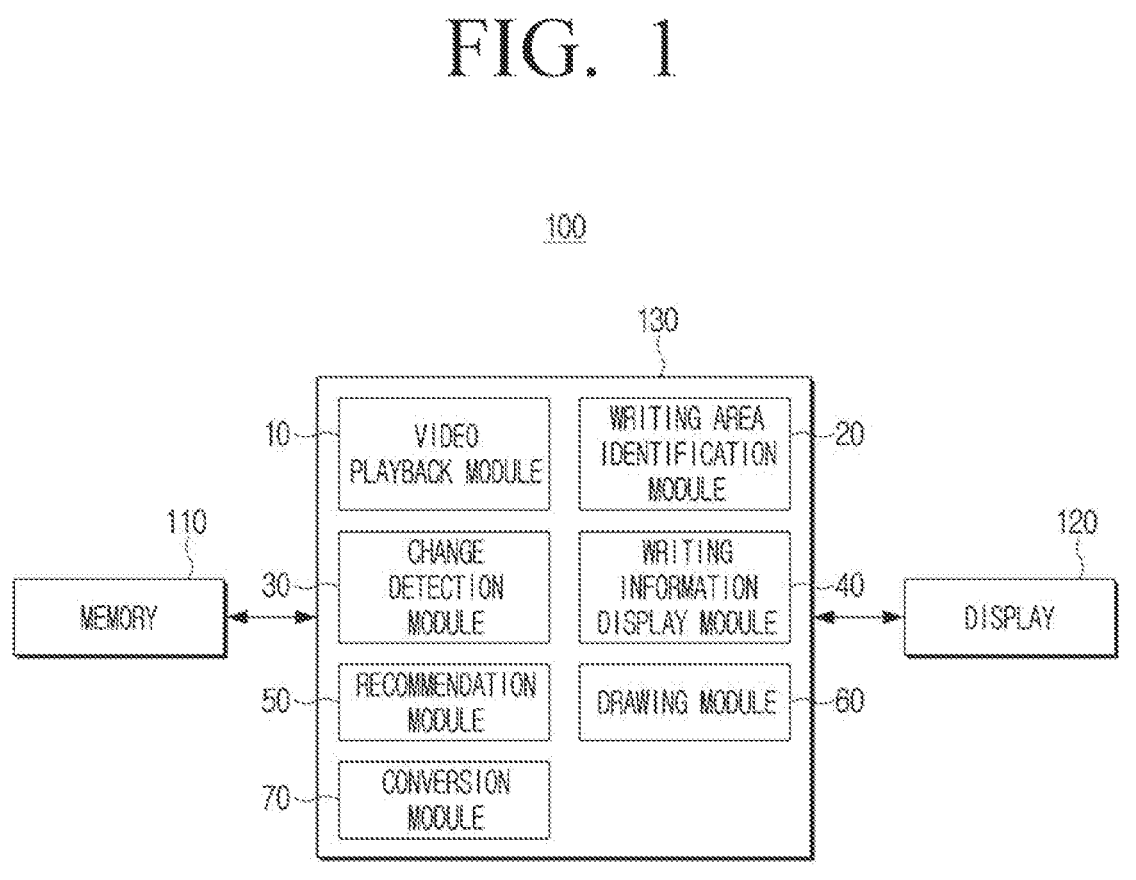

FIG. 1 is a block diagram illustrating a configuration of an electronic device according to an embodiment of the present disclosure. An electronic device 100 according to the present disclosure may automatically record and provide writing information in a video displayed on one area of a display 120.

Referring to FIG. 1, the electronic device 100 may include a memory 110, the display 120, and a processor 130. According to the present disclosure, the electronic device 100 may be implemented as any of various types of elec-tronic devices such as a smart phone, a tablet personal computer (PC), a mobile phone, a video phone, an e-book reader, a television (TV), a desktop PC, a laptop PC, a netbook computer, a workstation, a camera and a smart watch. However, the electronic device 100 according to the present disclosure is not limited thereto and may be imple-mented as any of various electronic devices including a display.

The memory 110 may store various programs and data that may be necessary for an operation of the electronic device 100. In detail, the memory 110 may store at least one instruction. The processor 130 may perform the operation of the electronic device 100 by executing the instruction stored in the memory 110.

The memory 110 may be implemented as a non-volatile memory, a volatile memory, a flash-memory, a hard disk drive (HDD), a solid state drive (SSD), or the like. The memory 110 may be accessed by the processor 130, and readout, recording, correction, deletion, update, and the like, of data may be performed by the processor 130. In addition, the memory 110 may store programs and data for configuring various screens to be displayed in a display area of the display.

The display 120 may display various information under control of the processor 130. The display 120 may display various images such as a broadcast content and a multimedia content.

In addition, the display 120 may be implemented as various types of displays such as a liquid crystal display (LCD), a light emitting diode (LED), an organic light emitting diode (OLED), a liquid crystal on silicon (LCoS), and a digital light processing (DLP). In addition, the display 120 may also include a driving circuit which may be implemented in the form of an amorphous silicon (a-si) TFT, a low temperature poly silicon (LTPS) TFT or an organic TFT (OTFT), a backlight unit, or the like.

In addition, the display 120 may be implemented as a touch screen in combination with a touch sensor.

In addition, the display 120 may display various user interfaces (UIs) and icons.

In particular, the video may be displayed in a first area of the display 120, and an image corresponding to the writing information included in the video may be displayed in a second area of the display 120. In addition, according to an embodiment, the electronic device 100 may include the plurality of displays 120. For example, the electronic device 100 may include two displays (e.g., a first display and a second display). In this case, the processor 130 may control the first display to display the video on the first display, and control the second display to display the image corresponding to the writing information in the video on the second display. The above description describes that the display 120 is distinguished into the first area and the second area, and the present disclosure is not limited thereto. That is, the electronic device 100 may further display a recommendation image in a third area of the display 120. The third area of the display is described below with reference to a recommendation module 50.

The processor 130 may be electrically connected to the memory 110 to control overall operations and functions of the electronic device 100. The processor 130 may control the overall operations of the electronic device 100. To this end, the processor 130 may include one or more of a central processing unit (CPU), an application processor (AP), and a communication processor (CP). The processor 130 may be implemented in various ways. For example, the processor 130 may be implemented as at least one of an application specific integrated circuit (ASIC), an embedded processor, a microprocessor, a hardware control logic, a hardware finite state machine (FSM) or a digital signal processor (DSP). Meanwhile, in the present disclosure, a term the "processor 130" may be used to include the central processing unit (CPU), a graphic processing unit (GPU), a main processing unit (MPU) or the like.

The processor 130 may drive an operating system or an application program to control hardware or software components connected to the processor 130, and perform various kinds of data processing and calculation. In addition, the processor 130 may load and process instructions or data received from at least one of other components in the volatile memory, and store various data in the non-volatile memory.

In particular, the processor 130 may provide an automatic writing function which provides the writing information included in the video displayed in the first area of the display 120. That is, the electronic device 100 may automatically record the writing information in the video displayed in one area of the display by using the automatic writing function.

In an embodiment according to the present disclosure, the automatic writing function may be implemented by a plurality of modules 10 to 70 included in the processor 130 as shown in FIG. 1. The electronic device 100 may include the plurality of modules for implementing the automatic writing function. However, this configuration is only an embodiment, and an external server may include at least a part of the automatic writing function.

As described above, the plurality of modules 10 to 70 may be positioned in the processor 130, the present disclosure is not limited thereto, and the plurality of modules 10 to 70 may be positioned in the memory 110. In case that the plurality of modules 10 to 70 are positioned in the memory 110, the processor 130 may load the plurality of modules 10 to 70 from the non-volatile memory to the volatile memory to execute each function of the plurality of modules 10 to 70. "Loading" refers to an operation of loading and storing data stored in the non-volatile memory into the volatile memory so that the processor 130 may access the data.

The automatic writing function may be implemented through a video playback module 10, a writing area identification module 20, a change detection module 30, a writing information display module 40, a recommendation module 50, a drawing module 60, and a conversion module 70. The plurality of modules may be implemented by respective software, the present disclosure is not limited thereto, and some of the modules may be implemented by a combination of hardware and software. In another embodiment, the plurality of modules may be implemented by single software.

The video playback module 10 may be configured to display the video in the first area of the display 120. For example, the video according to the present disclosure may be a lecture video provided by an e-learning system or the like.

In detail, a video file in the electronic device 100 may be executed, and in this case, the video playback module 10 may control the display 120 to display the executed video in the first area. However, the present disclosure is not limited thereto, and the video playback module 10 may control the display 120 to receive the video from the external server in a streaming manner and display the same in the first area. In addition, the electronic device 100 may include a camera, and in this case, the video playback module 10 may control the display 120 to display the video captured by the camera in the first area. However, the present disclosure is not limited thereto, and the video playback module 10 may acquire the video through various manners, and control the display 120 to display the acquired video in the first area.

The writing area identification module 20 is configured to identify the writing area including at least one writing information in the video displayed in the first area through the video playback module 10. The writing information refers to information on a writing content included in the lecture video. The writing information may include a text image, a figure image, a formula image, and the like. For example, the writing information may include writing information written directly by an instructor in the video through a blackboard, or the like, and writing information included in a display device in the video.

In an embodiment according to the present disclosure, the writing area may refer to an area including the plurality of writing information in the video being displayed in the first area of the display 120. For example, the instructor in the video may write the content by using the blackboard, and in this case, the writing area identification module 20 may identify a blackboard area in the video as the writing area. For another example, the instructor in the video may give a lecture by using the display device, and in this case, the writing area identification module 20 may identify a screen area of the display device in the video as the writing area. In addition, the writing area identification module 20 may store information in a writing area including the writing information in the identified writing area when the writing area is identified, and transmit the same to the change detection module 30.

In addition, the writing area identification module 20 may identify the plurality of writing areas in the video. For example, the blackboard and the display device may be included in the video, and in this case, the writing area identification module 20 may identify the blackboard area in the video as a first writing area and the area of the display device as a second writing area.

In addition, the change detection module 30 may identify sub-writing areas in the identified writing area. In detail, the writing information may first be added to a part of the first writing areas in the video, and in this case, the writing area identification module 20 may identify this area including the corresponding writing information as a first sub-writing area. In addition, the writing information may be added to an area near the first sub-writing area, and in this case, the writing area identification module 20 may identify this area further including the writing information added to the existing first sub-writing area as the first sub-writing area. However, the writing information may be added to an area away from the first sub-writing area at a distance, and in this case, the writing area identification module 20 may identify this area including the added writing information as a second sub-writing area.

In the above-described embodiment, it is described that the change detection module 30 identifies the writing area in the video and identifies the sub-writing area in the identified writing area, and the present disclosure is not limited thereto. That is, the change detection module 30 may directly identify the sub-writing area without a process of identifying the writing area in the video being displayed in the first area of the display 120. Methods of identifying the writing area and the sub-writing area are described below in detail with reference to the following drawings.

The change detection module 30 is configured to detect a change in at least a part of the writing information included in the writing area.

In detail, the writing information may first be identified in the video, and in this case, the writing area identification module 20 may identify an area including the corresponding writing information as the first writing area. In addition, the change detection module 30 may receive first information in the first writing area from the writing area identification module 20. The first information may include writing information included in the first writing area. In addition, the change detection module 30 may receive second information in the first writing area from the writing area identification module 20 due to a change in the writing information in the first writing area after receiving the first information. The second information may include writing information included in the first writing area, changed by a user input.

In addition, the change detection module 30 may detect whether the writing information included in the first writing area is changed by comparing the first information and the second information with each other. For example, the change in the writing information may be a change of deleting at least a part of the writing information and adding new writing information to an area including the deletion.

In addition, the change detection module 30 may identify a corresponding type of a change when detecting the change in at least a part of the writing information included in the first writing area by comparing the first information and the second information with each other. The type of a change may include a change to correct a simple typo, a change to intentionally explain a changed content, a change including deletion to secure a writing area, and the like. The change to correct a simple typo may be a change in writing information to correct the instructor's typo or mistake. In addition, the change to intentionally explain a changed content is a change in the writing information for the lecture, and may be a case where the instructor intentionally changes the writing information. In addition, the change including deletion to secure a writing area may be a case where the instructor deletes the existing writing information to secure the writing area and adds the new writing information to the corresponding area when a writing space is insufficient.

In particular, the change detection module 30 may detect the type of a change on the basis of voice data or subtitle data in the video.

The change detection module 30 may identify at least one of the voice data and the subtitle data, corresponding to changed writing information in the video. In addition, the change detection module 30 may identify the type of a change through the identified voice data or subtitle data.

For example, the change detection module 30 may identify whether the voice data or subtitle data is included in the video within a period (e.g., 5 seconds) of a predetermined range from time when the corresponding change is detected in the video when detecting the change in at least a part of the writing information included in the first writing area. For example, the change detection module 30 may identify the type of a change as a change to correct a typo when identifying that the video includes voice data or subtitle data such as "typo," "misspelling," "oh," "whoops," "wrong" or the like within the period of 5 seconds before and/or 5 seconds after the time when the change is detected in the video.

For example, the change detection module 30 may identify the type of a change as a change to intentionally explain a changed content when detecting the change in at least a part of the writing information included in the first writing area, and identifying that the video includes voice data or subtitle data such as "careful," "cautious," "important" or the like within the period (e.g., 5 seconds) of a predetermined range from the time when the corresponding change is detected in the video.

For example, the change detection module 30 may identify the type of a change as the change including deletion to secure a writing area when detecting the change in at least a part of the writing information included in the first writing area, and identifying that the video includes voice data or subtitle data such as "next," "next page" or the like, or no voice data or no subtitle data, within the period (e.g., 5 seconds) of a predetermined range from the time when the corresponding change is detected in the video.

In addition, For example, the change detection module 30 may identify the type of a change by further considering a maintenance period of deleted writing information and a size of an area corresponding to the changed writing information, together with the voice data or subtitle data corresponding to the changed writing information.

For example, the change detection module 30 may identify whether "mistake" indicates a simple typo or is meant to teach a content in which a student easily makes a mistake by considering the maintenance period of deleted writing information and the size of the area corresponding to the changed writing information when identifying that the video includes voice data or subtitle data such as "mistake" or the like within the period (e.g., 5 seconds) of a predetermined range from the time when the corresponding change is detected in the video. That is, the maintenance period of the deleted writing information may be less than or equal to a predetermined period (e.g., 2 seconds), and the size of the area corresponding to the changed writing information is less than or equal to a predetermined size (e.g., size corresponding to that of one word in the writing information). In this case, the change detection module 30 may identify "mistake" as indicating the simple typo, and identify the type of a change as the change to correct a typo. On the other hand, the maintenance period of the deleted writing information may be more than the predetermined period (e.g., 2 seconds), and the size of the area corresponding to the changed writing information may greater than the predetermined size (e.g., size corresponding to that of one word in the writing information). In this case, the change detection module 30 may identify "mistake" as being meant to teach the content in which a student easily makes a mistake, and identify the type of a change as the change to intentionally explain a changed content.

For example, the change detection module 30 may identify the type of a change as the change including deletion to secure a writing area when identifying that the voice data or subtitle data such as "next page" is included within the period (e.g., 5 seconds) of a predetermined range from the time when the change is detected in the video, and the size of the area corresponding to the changed writing information is 90% or more of that of the first writing area.

For example, the change detection module 30 may also identify the type of a change by inputting the voice data or subtitle data included within a period (e.g., 10 seconds) of a predetermined range from the time when the change is detected in the video into an artificial intelligence model for identifying the type of a change in case of detecting the change in at least a part of the writing information included in the first writing area. That is, the artificial intelligence model for identifying the type of a change may identify the type of a change by synthesizing the plurality of input voice data and subtitle data.

When identifying the type of a change, the change detection module 30 may transmit the changed writing information between the first information and the second information and the identified type of a change to the writing information display module 40.

In addition, the change detection module 30 may detect whether the writing information is newly added to the first writing area by comparing the first information and the second information with each other. That is, the change detection module 30 may identify information in which new writing information is added to the first information as the second information when identifying that the existing writing information included in the first writing area is maintained as it is, and new writing information is added thereto, by comparing the first information and the second information with each other. The change detection module 30 may then transmit the writing information added from the first information to the second information to the writing information display module 40.

The writing information display module 40 is configured to acquire an image corresponding to the writing area and display the acquired image in the second area of the display 120.

In detail, the writing information display module 40 may receive the first information in the first writing area from the change detection module 30 and generate a first image corresponding to the first information. The writing information display module 40 may then control the display 120 to display the generated first image in the second area of the display 120. The writing information display module 40 may generate one image corresponding to one writing area and display the same in the second area of the display 120, and the present disclosure is not limited thereto. That is, the writing information display module 40 may generate the plurality of images each corresponding to the writing information included in one writing area, and display the generated plurality of images in the second area of the display 120.

In addition, the writing information display module 40 may receive the changed writing information and the identified type of a change between the first information and the second information from the change detection module 30, and in this case, the writing information display module 40 may generate a second image in which the first image is modified on the basis of the changed writing information and the identified type of a change between the first information and the second information. The writing information display module 40 may then control the display 120 to display the second image instead of the first image in the second area of the display 120.

When identifying the type of a change as the simple typo change, the writing information display module 40 may generate the second image by replacing the writing information deleted from the writing information included in the first image with the writing information added thereto through the change, on the basis of the changed writing information between the first information and the second information. The writing information display module 40 may then control the display 120 to display the second image instead of the first image in the second area of the display 120.

When identifying the type of a change as the change to intentionally explain a changed content, the writing information display module 40 may generate the second image by maintaining the writing information deleted from the first image as it is, and including an indicator indicating the deletion and the added writing information in the first image on the basis of the changed writing information between the first information and the second information. The writing information display module 40 may then control the display 120 to display the second image instead of the first image in the second area of the display 120.

When the type of a change is identified as the change including deletion to secure a writing area, the writing information display module 40 may generate the second image including the first image and the added written information on the basis of the changed the writing information between the first information and the second information. The writing information display module 40 may then control the display 120 to display the second image instead of the first image in the second area of the display 120.

On the other hand, the plurality of writing areas may exist in the video, and in this case, the writing information display module 40 may generate the images each corresponding to the plurality of writing areas, and control the display 120 to sequentially display the generated plurality of images in the second area. That is, the writing area identification module 20 may identify the first writing area and the second writing area in the video, and in this case, the writing information display module 40 may display a 1-1-th image corresponding to the first writing area and a 1-2-th image corresponding to the second writing area. The writing information display module 40 may then control the display 120 to sequentially display the generated 1-1-th and 1-2-th images in the second area of the display 120.

In the above-described embodiments, it is described that an image to which the corresponding change is applied is immediately displayed in the second area when the change in the writing information in the video is detected, and the present disclosure is not limited thereto. That is, the electronic device 100 may display the image to which the change in the writing information in the video is applied as the recommendation image in the third area of the display 120 through the recommendation module 50 without directly displaying the same in the second area.

In detail, the writing information display module 40 may generate the first image, and in this case, the recommendation module 50 may display the first image in the third area, which is an area for recommending writing information. The third area may be an area separated from the second area of the display 120, the present disclosure is not limited thereto, and the third area may be positioned in the second area.

In addition, the recommendation module 50 may display the first image in the second area when receiving the user input for including the first image in the second area. The user input for including the first image in the second area may be a user input for selecting the first image displayed in the third area, the present disclosure is not limited thereto, and this user input may be any of various user inputs such as a user input for selecting an icon displayed in the third area.

In addition, the writing information display module 40 may generate the second image while the first image is displayed in the second area, and in this case, the recommendation module 50 may display the second image in the third area while displaying the first image in the second area. In addition, the electronic device 100 may change the first image displayed in the second area to the second image and display the same when receiving a user input for including the second image in the second area.

That is, the recommendation module 50 may display an image reflecting an instructor handwriting in the video in real time in the third area, and selectively include the image in the second area based on user selection. Therefore, the recommendation module 50 may control the display 120 not to display the second image reflecting the change in real time based on the change in the instructor's writing information in the video directly in the first area for a user who does not want automatic recording.

For example, the plurality of writing areas may exist in the video, and in this case, the recommendation module 50 may control the display 120 to display images each corresponding to the plurality of writing areas in the third area of the display 120. In addition, the recommendation module 50 may control the display 120 to display an image in which a user input for including an image in the second area among the plurality of images displayed in the third area is detected in the second area.

For example, the writing area may be distinguished into the plurality of sub-writing areas, and in this case, the recommendation module 50 may control the display 120 to display images each corresponding to the plurality of sub-writing areas in the third area of the display 120. For example, the recommendation module 50 may display a 1-1-th image of the first sub-writing area and a 1-2-th image of the second sub-writing area in the third area. The electronic device 100 may then display an image selected from the 1-1 image and the 1-2 image displayed in the third area, in the second area.

The drawing module 60 is configured to perform drawing on an image displayed in the second area. That is, the drawing module 60 may control the display 120 to perform a drawing function on the image based on a user input when the user input for drawing is detected on the image displayed in the second area. The drawing function may include an interaction for deleting writing information included in the image displayed in the second area, an interaction for adding a new content, an interaction for moving position of the writing information included in the image displayed in the second area, and the like.

The conversion module 70 is configured to improve the sharpness and image quality of the image corresponding to the writing area, generated by the writing information display module 40.

For example, the conversion module 70 may identify writing information including a text from the image corresponding to the writing area by using an optical character reader (OCR), and provide the identified writing information in a text format.

For example, the instructor in the video may write directly through the blackboard, or the like, and in this case, the conversion module 70 may provide an image in which noise or the like included in the image corresponding to the writing area in the video is removed or converted. For example, the instructor in the video may make additional writing (e.g., graffiti) on the corresponding writing information to emphasize the writing information while writing the content. In this case, the conversion module 70 may replace the additional written content with another indicator, and control the display 120 to display the same together with the corresponding writing information.

The above-described embodiment only describes a case where the conversion module 70 according to the present disclosure identifies a text or removes noise from the image corresponding to the writing area, the present disclosure is not limited thereto, and the conversion module 70 may provide various functions for improving the sharpness and image quality of the image corresponding to the writing area.

Figure 2B:
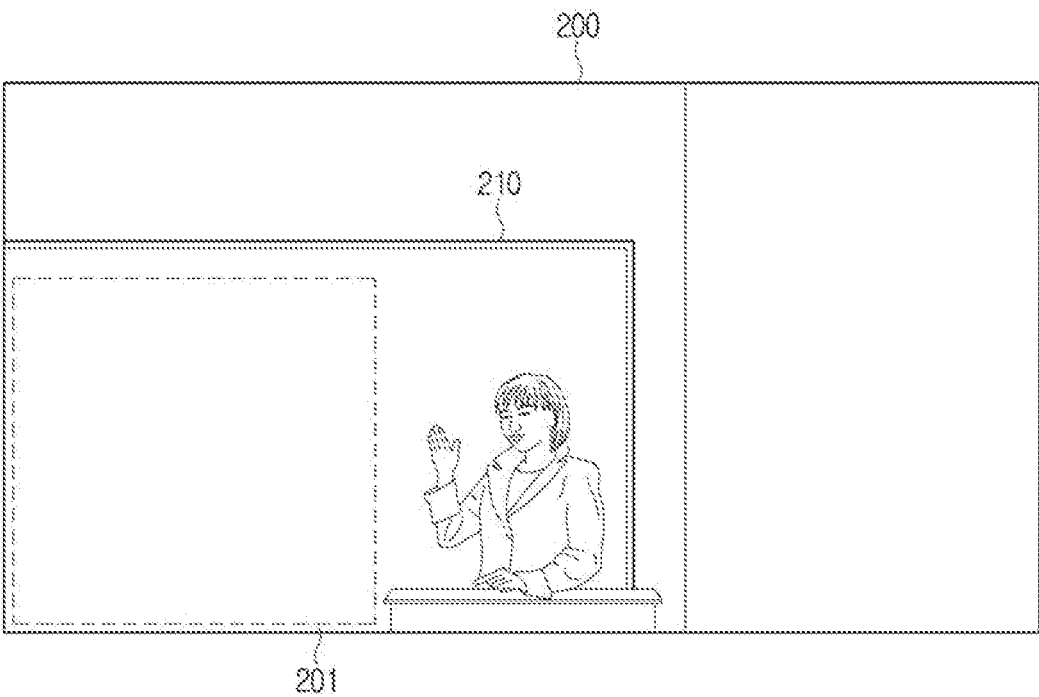
FIG. 2B is a view illustrating the writing area in a video, according to an embodiment.

FIGS. 2A and 2B are views illustrating a writing area in a video according to the present disclosure.

The electronic device 100 may display the video in one area 200 of the display 120. For example, the video may be a lecture video provided by an e-learning system or the like.

In addition, the electronic device 100 may identify a writing area 201 in the video displayed in the one area 200 of the display 120. The writing area 201 may be an area including at least one writing information in the video, and may be, for example, an internal area of a blackboard area 210 displayed in the video. FIGS. 2A and 2B identify the internal area of the blackboard area 210 in the video as the writing area 201, the present disclosure is not limited thereto, and the electronic device 100 may identify an area of the display device in the video as the writing area when the instructor in the video displays the writing content through the display device.

The electronic device 100 may identify an entire blackboard area in the video as the writing area 201 as shown in FIG. 2A, and the present disclosure is not limited thereto. The blackboard area and an area where the instructor is located may overlap with each other, and in this case the electronic device 100 is unable to identify the writing information in the overlapping area. Therefore, the electronic device 100 may identify an area excluding the area where the instructor is located in the blackboard area 210 in the video as the writing area 201 as shown in FIG. 2B.

FIGS. 2A and 2B show that the one writing area 201 exists in the video in, and the present disclosure is not limited thereto. For example, the blackboard and the display device may be included in the video, and in this case, the electronic device 100 may identify the blackboard area in the video as the first writing area and the area of the display device as the second writing area. As another example, the plurality of blackboards may be included in the video, and in this case, the electronic device 100 may identify an area of each blackboard as different writing areas.

Figure 3A:
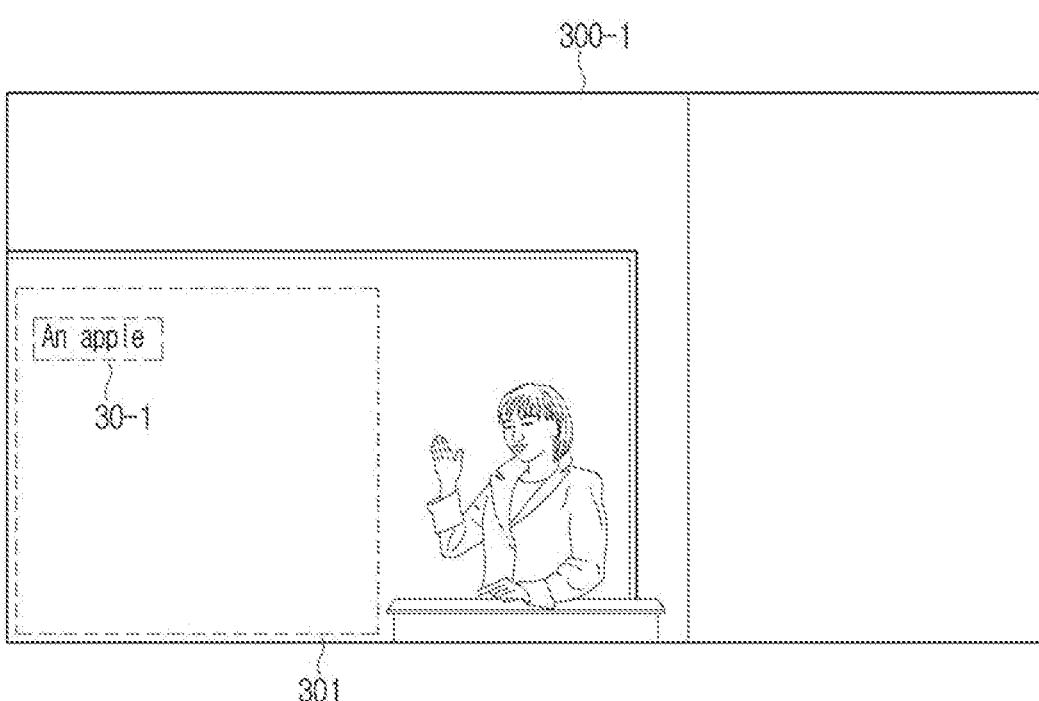
FIG. 3A is a view illustrating a sub-writing area in the writing area in a video, according to an embodiment.
Figure 3B:
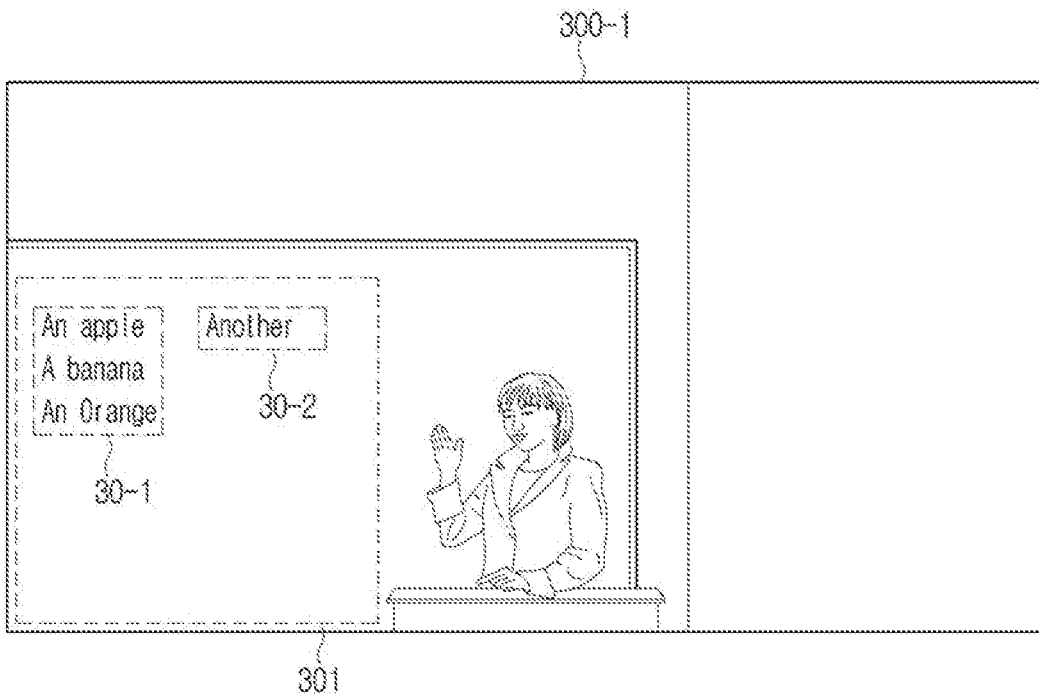
FIG. 3B is a view illustrating a method of identifying the plurality of sub-writing areas in the writing area in a video, according to an embodiment.

FIG. 3A is a view illustrating the sub-writing area in the writing area in a video; and FIG. 3B is a view illustrating a method of identifying the plurality of sub-writing areas in the writing area in a video.

The electronic device 100 may identify the sub-writing area in a writing area 301 in the video.

According to the present disclosure, the sub-writing area may refer to a unit included in the image corresponding to the writing information. That is, a content may be written as shown in FIG. 3B, and in this case, the electronic device 100 may generate a 1-1-th image corresponding to a first sub-writing area 30-1, and a 1-2-th image corresponding to a second sub-writing area 30-2.

Referring to FIG. 3A, writing information "An apple" may be written in the writing area 301 for the first time, and in this case, the electronic device 100 may identify an area including the corresponding writing information as the first sub-writing area 30-1.

In addition, the writing information may be added in the writing area 301 by the instructor's writing, and in this case, the electronic device 100 may identify whether the added handwriting information to be included in the first sub-writing area 30-1 or a new writing area.

For example, writing information "A banana" and "An Orange" may be added to an area within a predetermined distance from the existing writing information "An apple" as shown in FIG. 3B. In this case, the electronic device 100 may identify, as the first sub-writing area 30-1, the area including the existing writing information "An apple" and the added writing information "A banana" and "An Orange."

On the other hand, writing information "Another" may be added in an area away from the existing writing information "An apple" by the predetermined distance. In this case, the electronic device 100 may identify an area including the added writing information "Another" as the second sub-writing area 30-2.

In the above-described embodiment, the sub-writing area is distinguished based on the distance between the writing information, and the present disclosure is not limited thereto. That is, the electronic device 100 may distinguish the sub-writing areas from each other by using time when the writing information is added, voice data of the instructor, the subtitle data in the video, or the like.

Figure 4A:
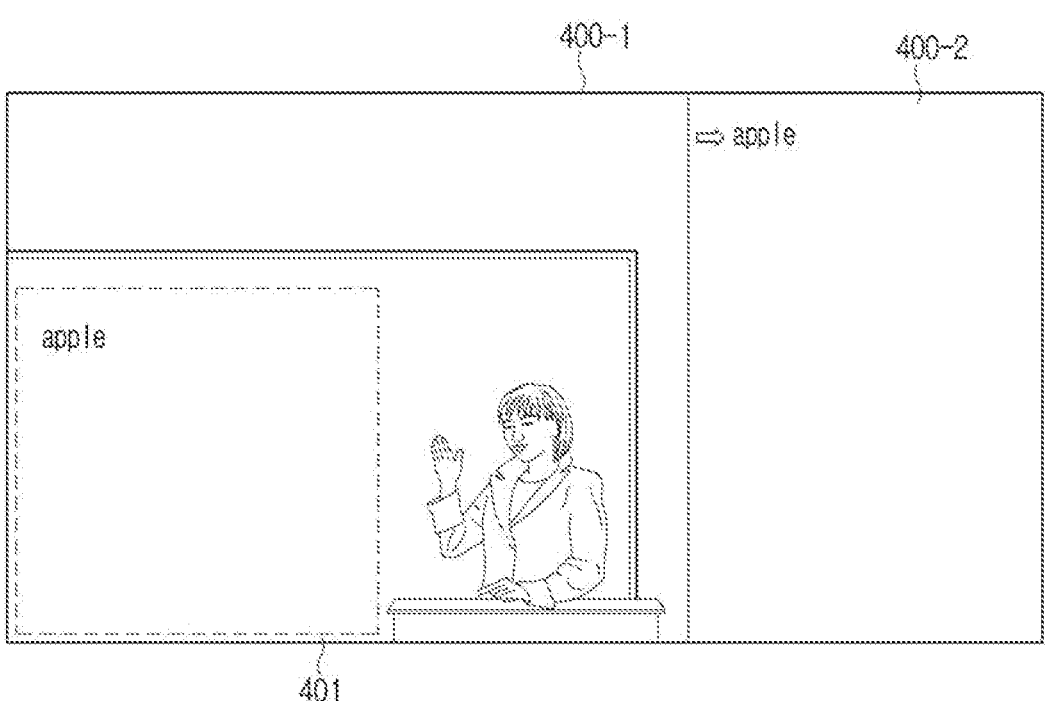
FIG. 4A is a view illustrating a method of providing an image corresponding to the writing area, according to an embodiment.
Figure 4B:
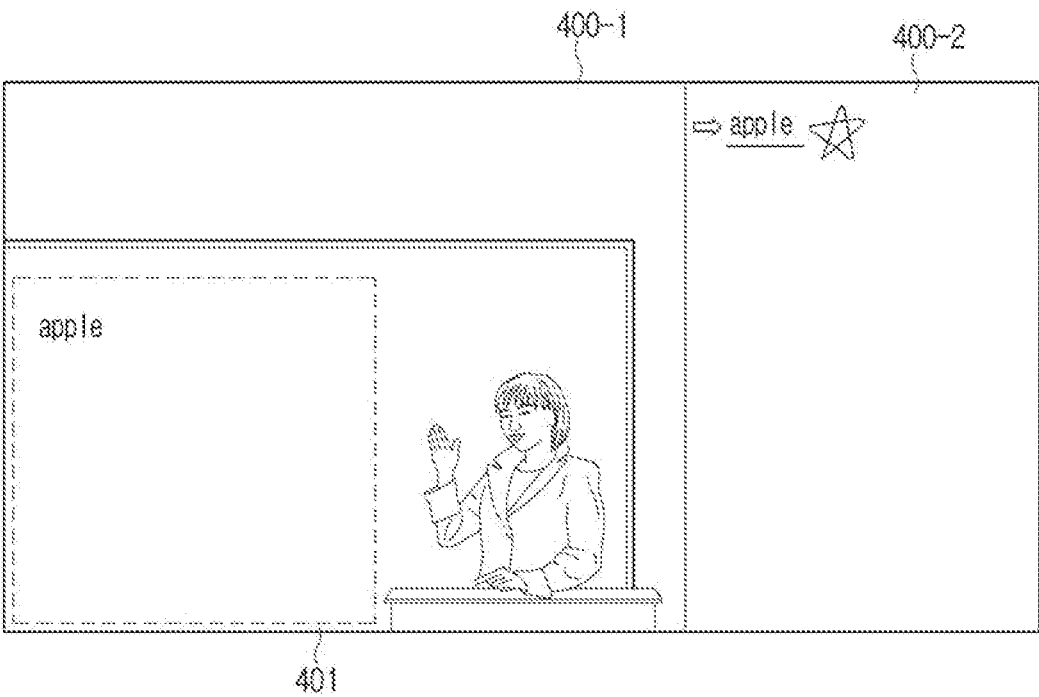
FIG. 4B is a view illustrating a feature of performing additional writing on the image corresponding to the writing area, according to an embodiment.

FIG. 4A is a view illustrating a method of providing the image corresponding to the writing area; and FIG. 4B is a view illustrating a feature of performing additional writing on the image corresponding to the writing area.

Referring to FIG. 4A, the electronic device 100 may display the video in a first area 400-1 of the display 120. In addition, the electronic device 100 may display an image corresponding to a writing area 401 in a second area 400-2 of the display 120.

The writing information such as "apple" may be added to the writing area 401, and in this case, the electronic device 100 may display an image corresponding to the writing information added to the second area 400-2 of the display as shown in FIG. 4A.

In addition, the electronic device 100 may perform the drawing function on the image displayed in the second area 400-2 when receiving a user drawing input for the second area 400-2. For example, the user drawing input may include drawing input by a mouse coupled with the electronic device 100, a touch drawing input for the second area 400-2 when the display 120 of the electronic device 100 is implemented as a touch screen, or the like.

Figure 5:
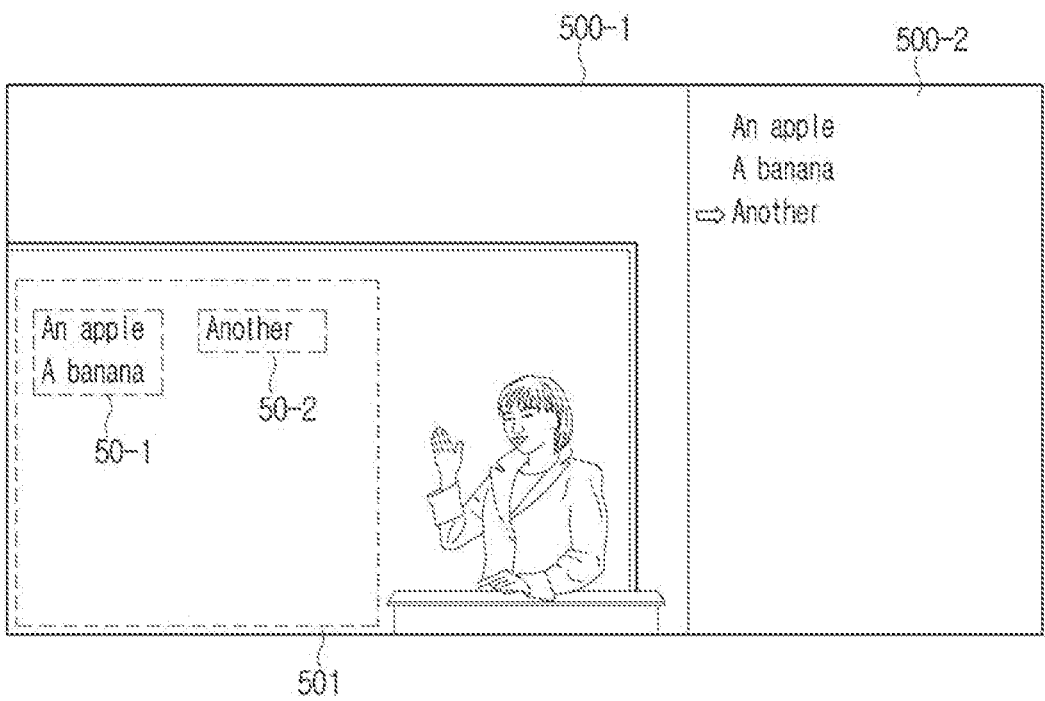
FIG. 5 is a view illustrating a method for providing an image corresponding to each sub-writing area according to an embodiment.

FIG. 5 is a view illustrating a method for providing an image corresponding to each sub-writing area according to the present disclosure.

The electronic device 100 may identify a writing area 501 in a first area 500-1 of the display 120 and identify a sub-writing area in the writing area 501. Referring to FIG. 5, the electronic device 100 may identify an area including writing information on "An apple" and "A banana" as a first sub-writing area 50-1, and identify an area including writing information on "Another" as a second sub-writing area 50-2.

The electronic device 100 may then display an image corresponding to the first sub-writing area 50-1 and an image corresponding to the second sub-writing area 50-2 in the second area 500-2 of the display 120.

FIG. 5 shows that the image corresponding to the first sub-writing area 50-1 is displayed above the image corresponding to the second sub-writing area 50-2, and the present disclosure is not limited thereto. That is, the image corresponding to the second sub-writing area 50-2 may be displayed above the image corresponding to the first sub-writing area 50-1. In addition, the electronic device 100 may change positions of the image corresponding to the first sub-writing area 50-1 and the image corresponding to the second sub-writing area 50-2 with each other by the user input.

Figure 6A:
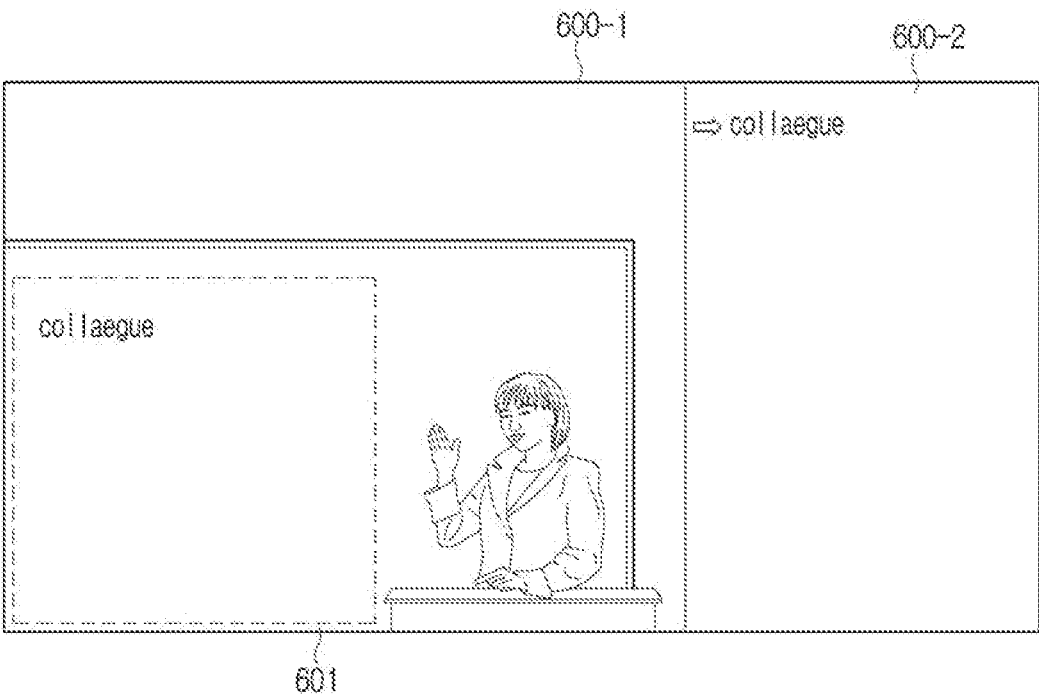
FIG. 6A is a view illustrating a simple typo change among types of a change in writing information according to an embodiment.
Figure 6B:
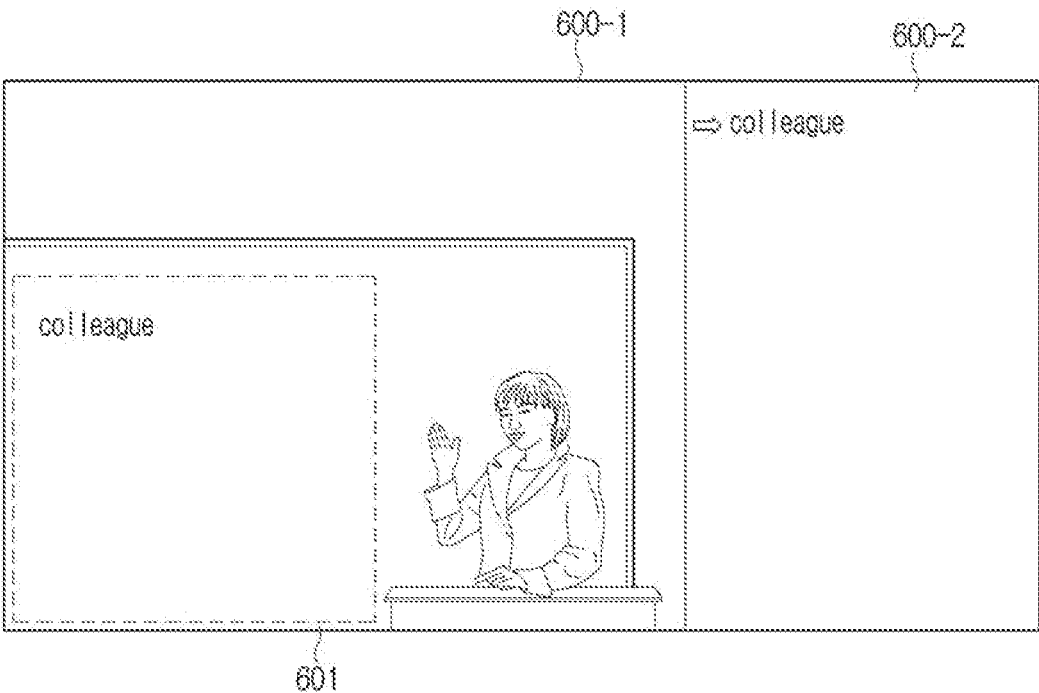
FIG. 6B is a view illustrating the simple typo change among the types of a change in writing information accord-ing to an embodiment.

FIGS. 6A and 6B are views illustrating a simple typo change among types of a change in the writing information according to the present disclosure.

Referring to FIG. 6A, the instructor in the video may write "collaegue" in a writing area 601. In this case, the electronic device 100 may identify first information including writing information on "collaegue" in the writing area 601 within a first area 600-1 of the display 120, and display an image corresponding to the first information in a second area 600-2 of the display 120.

The instructor in the video may then change the previously written "collaegue" to "colleague." In this case, the electronic device 100 may identify second information including the writing information on "colleague" in the writing area 601.

The electronic device 100 may then detect whether the writing information included in the writing area 601 is changed by comparing the first information and the second information with each other. The electronic device 100 may identify the type of a change when detecting that the writing information included in the writing area 601 is changed.

For example, the electronic device 100 may identify the type of a change by using the voice data and the subtitle data. The electronic device 100 may identify the corresponding type of a change as the change to correct a typo when the instructor in the video changes the previously written "collaegue" to "colleague," and the video includes voice data or subtitle data such as "typo," "misspelling," "oh," "whoops," "wrong" or the like within the period (e.g., 5 seconds) of the predetermined range from time when this change is detected.

However, the present disclosure is not limited to the above-described example, and the electronic device 100 may identify the type of a change in consideration of a changed content by comparing the first information and the second information with each other.

For example, the electronic device 100 may identify the type of a change on the basis of the size of the area corresponding to the changed writing information by comparing the first information and the second information with each other. Referring to FIGS. 6A and 6B, the change from "collaegue" to "colleague" is only a change from "ae" to "ea" in the existing word, and the electronic device may identify the type of a change of FIGS. 6A and 6B as the change to correct a typo.

For example, the electronic device 100 may identify the type of a change on the basis of time when the writing information "collaegue" corresponding to the first information is maintained in the video. In general, the change to correct a typo may be performed in a short time period, and the electronic device 100 may thus identify the type of a change as the change to correct a typo when the instructor in the video writes "collaegue" and then changes "collaegue" to "colleague" within a predetermined time (e.g., 3 seconds).

In addition, the electronic device 100 may identify the type of a change by using all the voice data, the subtitle data, the size of the area corresponding to the changed writing information, and the time when the writing information corresponding to the first information is maintained in the video.

For example, when identifying that the type of a change is the change to correct a typo, the electronic device 100 may generate the second image corresponding to the second information, and display the first image displayed in the existing second area 600-2 as the second image.

For example, when identifying that the type of a change is the change to correct a typo, the electronic device 100 may generate the second image by replacing the writing information "ae" deleted from the first image with the added writing information "ea", and change the first image displayed in the existing second area 600-2 into the second image to thus display the same.

Figure 7A:
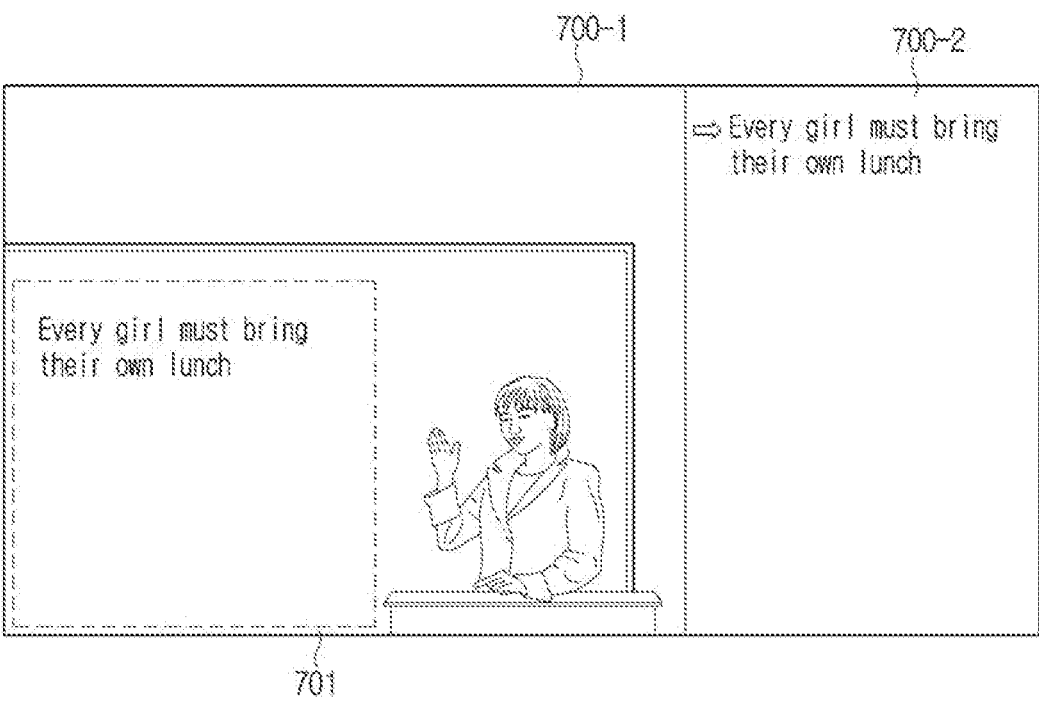
FIG. 7A is a view illustrating a change to intentionally explain a content of a change among the types of a change in writing information according to an embodiment.
Figure 7B:
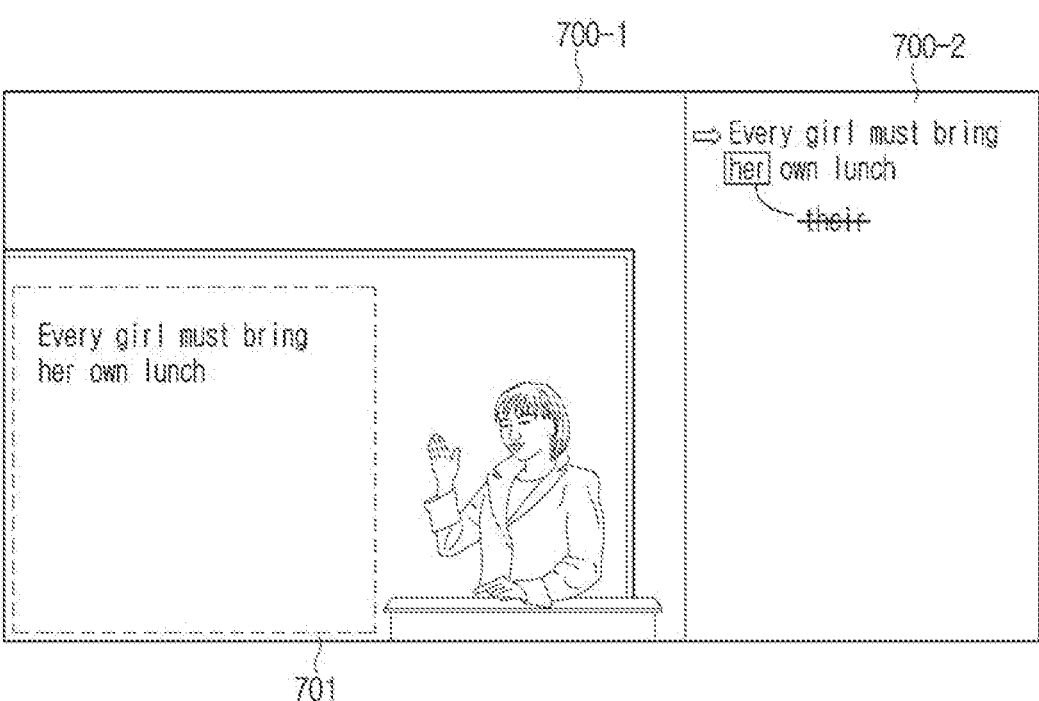
FIG. 7B is a view illustrating the change to intentionally explain a content of a change among the types of a change in writing information according to an embodiment.

FIGS. 7A and 7B are views illustrating a change to intentionally explain a content of a change among the types of a change in writing information according to the present disclosure.

Referring to FIG. 7A, the instructor in the video may write "Every girl must bring their own lunch" in a writing area 701. In this case, the electronic device 100 may identify first information including writing information on "Every girl must bring their own lunch" in the writing area 701 within a first area 700-1 of the display 120, and display an image corresponding to the first information in a second area 700-2 of the display 120.

The instructor in the video may then change the previously written "their" to "her." In this case, the electronic device 100 may identify second information including the writing information on "Every girl must bring her own lunch" in the writing area 701.

The electronic device 100 may then detect whether the writing information included in the writing area 701 is changed by comparing the first information and the second information with each other. The electronic device 100 may identify the type of a change when detecting that the writing information included in the writing area 701 is changed.

For example, the electronic device 100 may identify the type of a change by using the voice data and the subtitle data. The electronic device 100 may identify the corresponding type of a change as the change to intentionally explain a changed content when the instructor in the video changes the previously written "their" to "her" and the video includes voice data or subtitle data such as "careful," "cautious," "important" or the like within the period (e.g., 5 seconds) of the predetermined range from time when this change is detected.

However, the present disclosure is not limited to the above-described example, and the electronic device 100 may identify the type of a change in consideration of a changed content by comparing the first information and the second information with each other.

For example, the electronic device 100 may identify the type of a change on the basis of the size of the area corresponding to the changed writing information by comparing the first information and the second information with each other. Referring to FIGS. 7A and 7B, the change from "their" to "her" indicates that an entire word in the existing sentence is changed, and the electronic device 100 may thus identify the type of a change shown in FIGS. 7A and 7B as the change to intentionally explain a changed content.

For example, the electronic device 100 may identify the type of a change on the basis of the time when the changed writing information "their" among the writing information included in the first information is maintained in the video. In general, it may be necessary to explain a changed content within a certain period of time in order to intentionally explain this change, and a change in the writing information may not be performed within a short time. Therefore, the electronic device 100 may identify the type of a change as the change to intentionally explain a changed content when the instructor in the video writes "Every girl must bring their own lunch" and then changes "their" to "her" after the predetermined time period (e.g., 5 seconds) elapses.

In addition, the electronic device 100 may identify the type of a change by using all the voice data, the subtitle data, the size of the area corresponding to the changed writing information, and the time when the writing information corresponding to the first information is maintained in the video.

When identifying that the type of a change is the change to intentionally explain a changed content, the electronic device 100 may generate the second image including all of the deleted writing information "their" by the change in the first image, an indicator indicating the deletion (indicated by a strikethrough), the added writing information "her," and an indicator indicating the addition (indicated in a box), and display the second image in an existing second area 700-2, as shown in FIG. 7B.

Figure 8A:
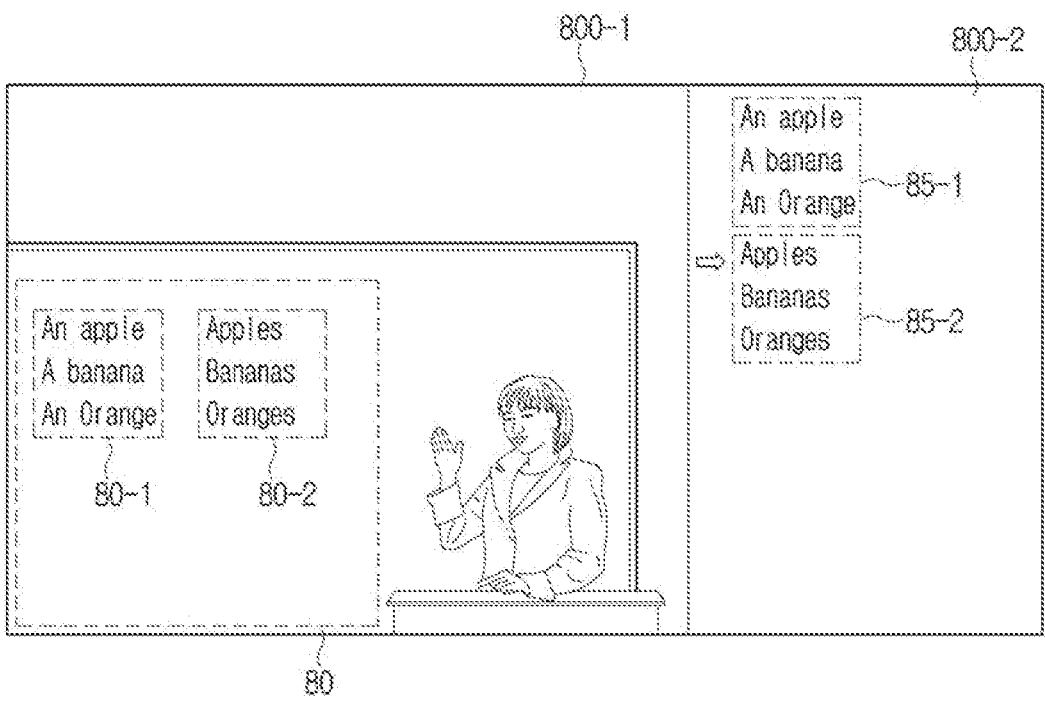
FIG. 8A is a view illustrating a change including deletion for securing the writing area among the types of a change in writing information according to an embodiment.
Figure 8B:
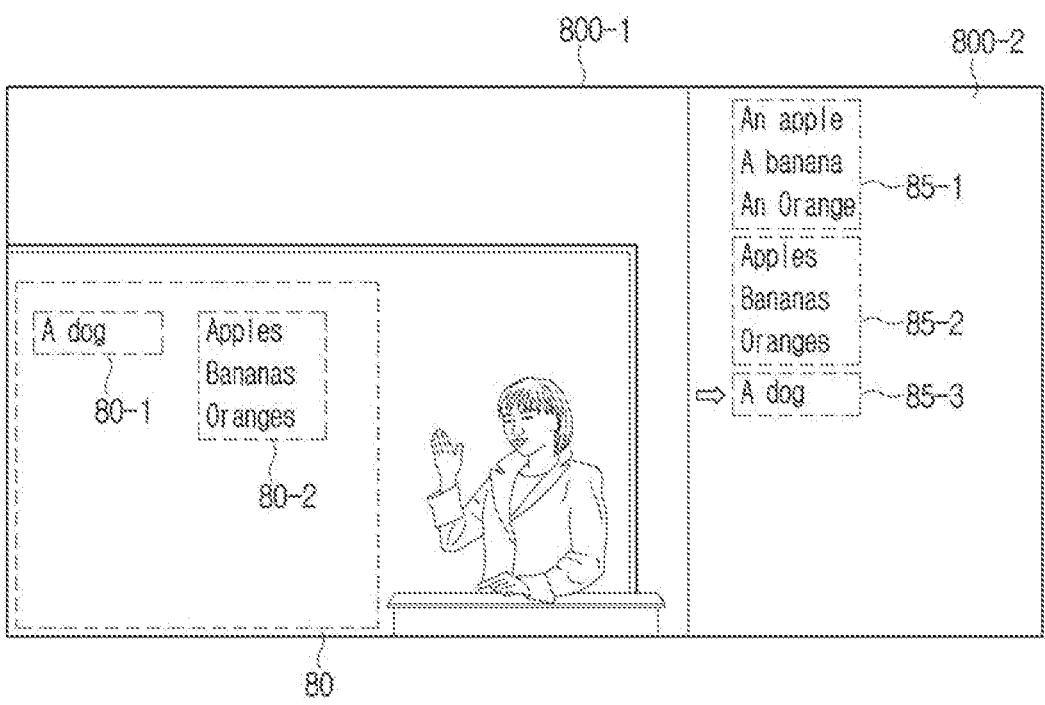
FIG. 8B is a view illustrating the change including deletion for securing the writing area among the types of a change of writing information according to an embodiment.

FIGS. 8A and 8B are views illustrating the change including deletion to secure a writing area among the types of a change in writing information according to the present disclosure.

Referring to FIG. 8A, the instructor in the video may write "An apple, A banana, An Orange" in a writing area 80. In this case, the electronic device 100 may identify, as a first sub-writing area 80-1, an area including writing information on "An apple, A banana, An Orange" in the writing area 80 within a first area 800-1 of the display 120. In addition, the electronic device 100 may identify 1-1-th information including writing information in the first sub-writing area 80-1, and display a 1-1 image 85-1 corresponding to the 1-1 information in a second area 800-2 of the display 120.

The instructor in the video may then write "Apples, Bananas, Oranges" in the writing area 80. In this case, the electronic device 100 may identify, as a second sub-writing area 80-2, an area including the writing information on "Apples, Bananas, Oranges" in the writing area 80. The electronic device 100 may then identify 1-2-th information including writing information in the second sub-writing area 80-2, and display a 1-2-th image 85-2 corresponding to the 1-2 information in the second area 800-2 of the display 120.

The electronic device 100 may then identify second information including new writing information on "A dog" in the first sub-writing area 80-1 when the instructor in the video erases the existing written content in the first sub-writing area 80-1 and writes the writing information on "A dog." The electronic device 100 may then identify the type of a change in the first sub-writing area 80-1 as the change including deletion to secure a writing area.

For example, the electronic device 100 may identify type of a change as the change including deletion to secure a writing area by using the voice data and the subtitle data. The electronic device 100 may identify the corresponding type of a change as the change including deletion to secure a writing area when the instructor in the video changes "An apple, A banana, An Orange" previously written in the existing first sub-writing area 80-1 to "A dog," and the video includes voice data or subtitle data such as "next," "next page," "following," or the like within the period (e.g., 10 seconds) of the predetermined range from time when this change is detected.

However, the present disclosure is not limited to the above-described example, and the electronic device 100 may identify the type of a change in consideration of a changed content by comparing the first information and the second information with each other.

For example, the electronic device 100 may identify the type of a change on the basis of the size of the area corresponding to the changed writing information by comparing the first information and the second information with each other. Referring to FIGS. 8A and 8B, the entire writing information written in the existing first sub-writing area 80-1 is changed, and the electronic device 100 may thus identify the type of a change shown in FIGS. 8A and 8B as the change including deletion to secure a writing area.

For example, the electronic device 100 may identify the type of a change on the basis of the time when the changed writing information is maintained in the video by comparing the second information with the writing information included in the first information. In general, the deletion of writing information to secure a writing area may be performed after long time elapses after the existing writing information is written. Therefore, the electronic device 100 may identify the type of a change as the change including deletion to secure a writing area when the instructor in the video writes "Apples, Bananas, Oranges" and changes "Apples, Bananas, Oranges" to "A dog" after a predetermined time (e.g., 15 seconds) elapses.

In addition, the electronic device 100 may identify the type of a change by using all the voice data, the subtitle data, the size of the area corresponding to the changed writing information, and the time when the writing information corresponding to the first information is maintained in the video.

For example, the electronic device 100 may generate the second image 85-2 corresponding to the second information when identifying that the type of a change is the change including deletion to secure a writing area. The electronic device 100 may then display a second image 85-3 together with the 1-1-th image 85-1 and the 1-2-th image 85-2 in the second area 800-2.

FIGS. 8A and 8B show that an image for each sub-writing area is generated and displayed in the second area 800-2, and the present disclosure is not limited thereto. That is, the electronic device 100 may generate one image including the writing information corresponding to the first sub-writing area 80-1 and the second sub-writing area 80-2, and display the same in the second area 800-2. A change may be detected as shown in FIG. 8B, and in this case, the electronic device 100 may generate the second image including all of the 1-1-th image 85-1, the 1-2-th image 85-2, and the image 85-3 corresponding to the second information, and display the same in the second area 800-2.

Figure 9A:
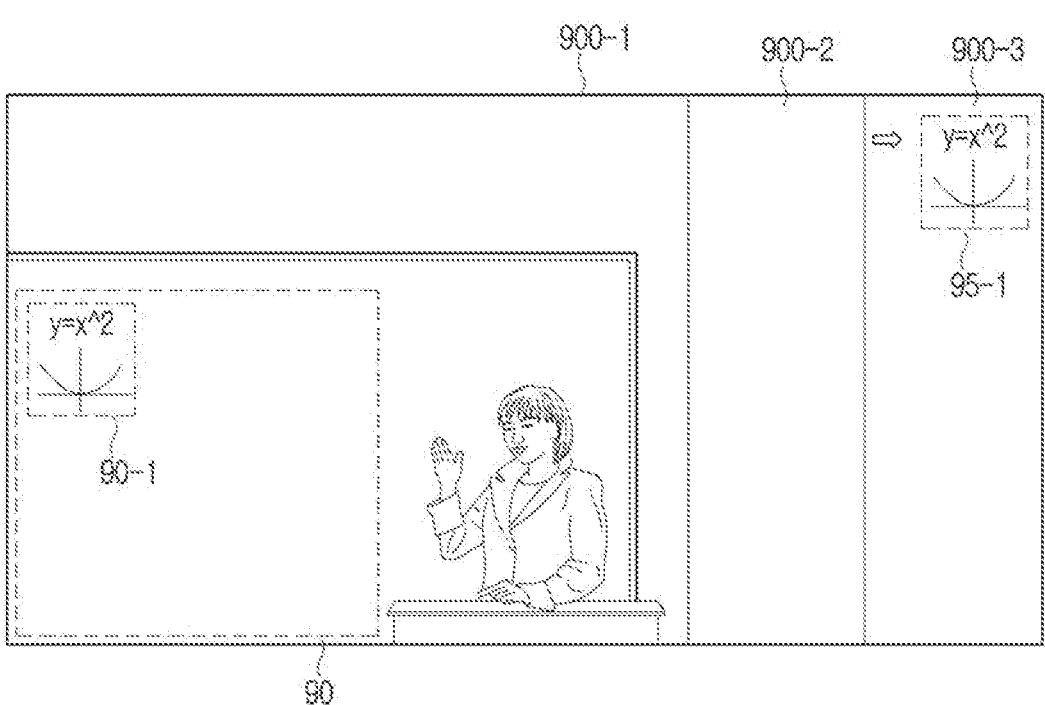
FIG. 9A is a view illustrating an area for recommending writing information according to an embodiment.
Figure 9B:
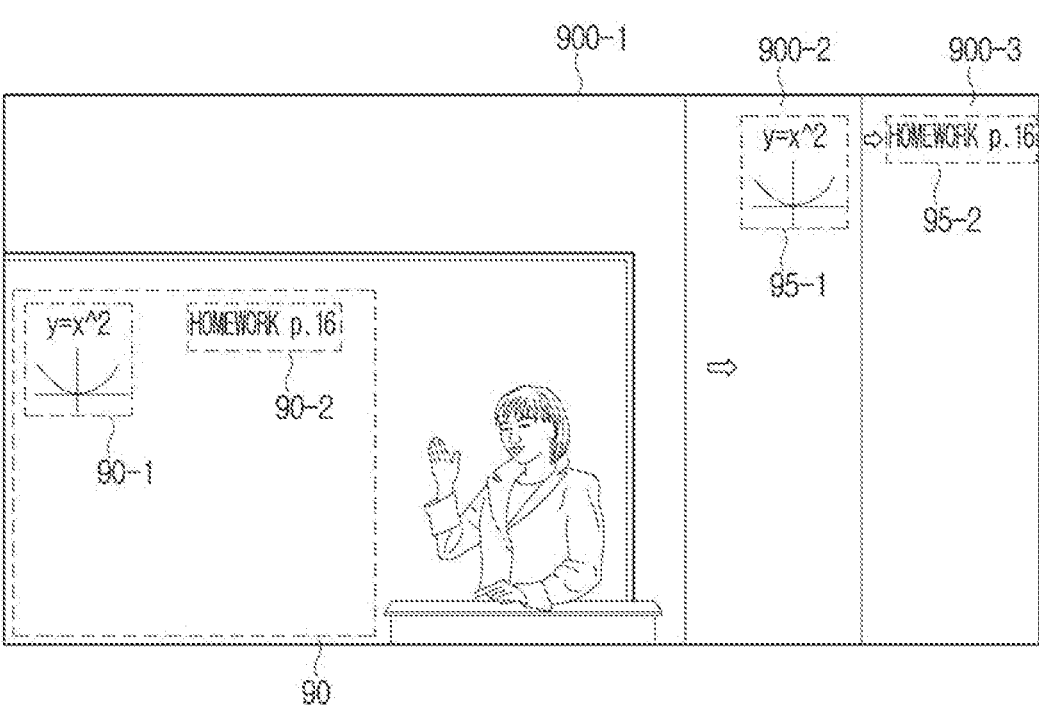
FIG. 9B is a view illustrating the area for recommending writing information according to an embodiment.
Figure 9C:
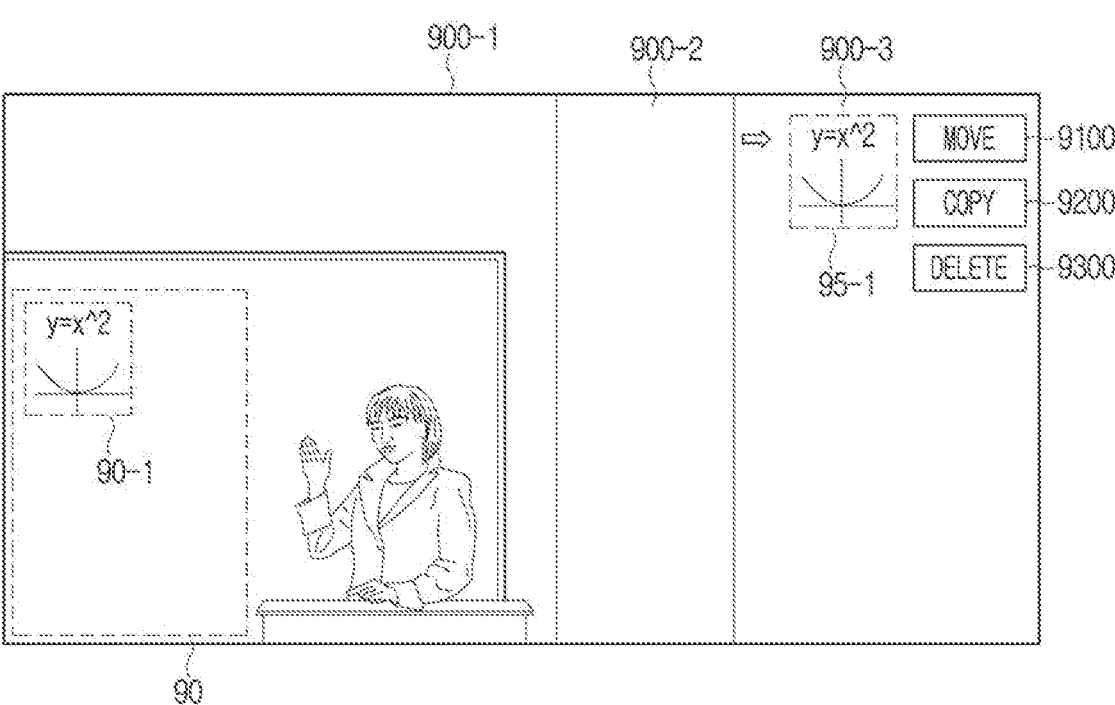
FIG. 9C is a view illustrating an icon in the area for recommending writing information according to an embodi-ment.

FIGS. 9A to 9C are views illustrating an area for recommending writing information according to the present disclosure.

Referring to FIG. 9A, the instructor in the video may write a formula and a graph in a writing area 90. In this case, the electronic device 100 may identify, as a first sub-writing area 90-1, an area including writing information on the formula and the graph in the writing area 90. The electronic device 100 may then identify 1-1-th information including writing information in the first sub-writing area 90-1, and display a 1-1-th image 95-1 corresponding to the 1-1 information in a third area 900-3 of the display 120.

The third area 900-3 may be the area for recommending writing information, and the electronic device 100 may display the 1-1-th image 95-1 displayed in the third area 900-3 in a second area 900-2 as shown in FIG. 9B when receiving a user input for including the 1-1-th image 95-1 displayed in the third area 900-3 in the second area 900-2. The user input for including the 1-1-th image 95-1 in the second area 900-2 may be a user input for selecting the 1-1-th image 95-1 displayed in the third area 900-3, the present disclosure is not limited thereto, and this user input may be any of various user inputs such as the user input for selecting an icon displayed in the third area.

For example, the electronic device 100 may display the 1-1-th image 95-1 in the second area 900-2 when detecting the user input for selecting an area corresponding to the 1-1-th image 95-1 displayed in the third area 900-3 of FIG. 9A. The user input for selecting the 1-1-th image 95-1 may include a user input for double-clicking the area corresponding to the 1-1-th image 95-1, a user input for dragging from the area corresponding to the 1-1-th image 95-1 to the second area 900-2, a user input for long pressing the area corresponding to the 1-1-th image 95-1, and the like.

For example, referring to FIG. 9C, the electronic device 100 may further display icons 9100, 9200, and 9300 corresponding to the 1-1-th image 95-1 in the third area 900-3. FIG. 9C is a view illustrating the icons 9100, 9200, and 9300 in the area for recommending writing information according to the present disclosure.

The first icon 9100 is an icon for displaying an image corresponding to the first icon 9100 in the second area 900-2. The first icon 9100 may be selected, and in this case, the electronic device 100 may display the 1-1-th image 95-1 in the second area 900-2.

The second icon 9200 is an icon for copying the image corresponding to the second icon 9200. The second icon 9200 may be selected, and in this case, the electronic device 100 may copy the 1-1-th image 95-1, and use the copied 1-1-th image 95-1 in another application of the electronic device 100 or transmit the copied 1-1-th image 95-1 to an external device.

The third icon 9300 is an icon for deleting the image corresponding to the third icon 9300. The third icon 9300 may be selected, and in this case, the electronic device 100 may control the display 120 so that the 1-1-th image 95-1 is not displayed in the third area 900-3.

In addition, as shown in FIG. 9B, the instructor in the video may write writing information on "Homework p. 16" in the writing area 90. In this case, the electronic device 100 may identify an area including the corresponding writing information as a second sub-writing area 90-2. The electronic device 100 may then identify 1-2-th information including writing information in the second sub-writing area 90-2, and display a 1-2-th image 95-2 corresponding to the 1-2 information in the third area 900-3 of the display 120.

Figure 10:
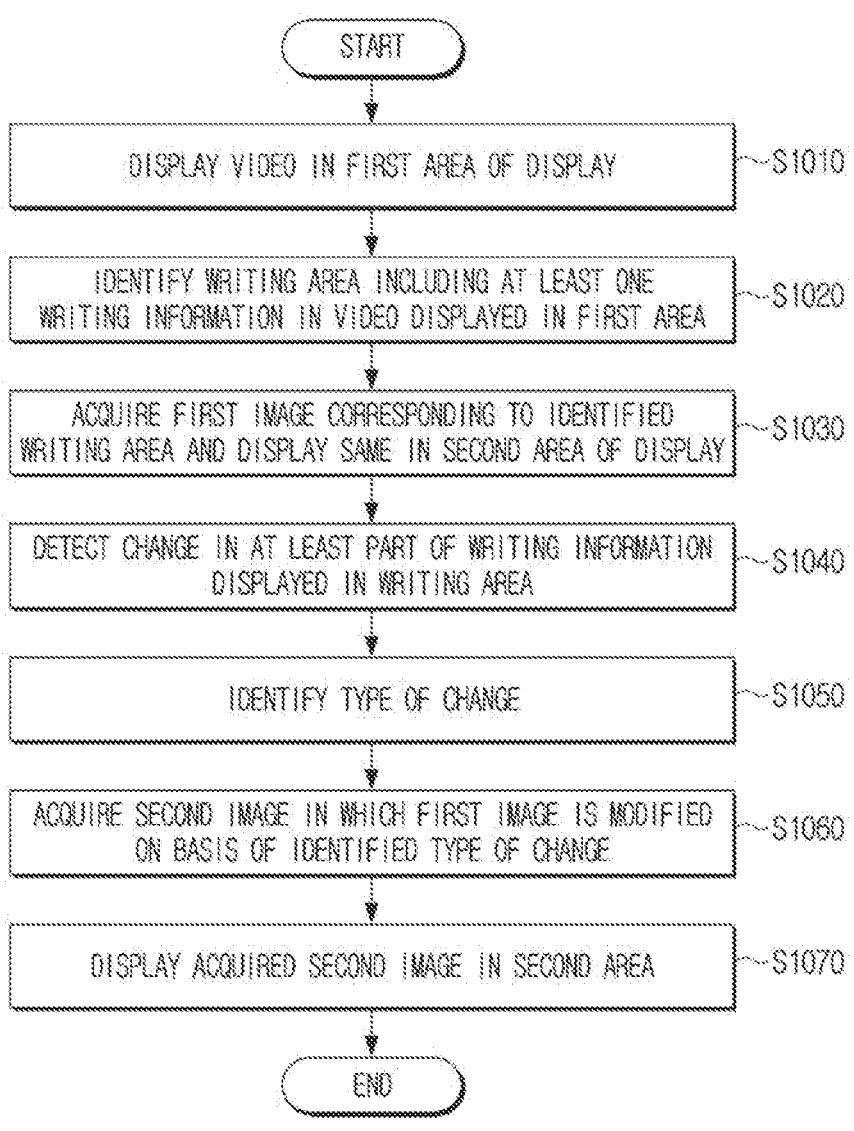
FIG. 10 is a flowchart illustrating a control method for an electronic device according to an embodiment.

In addition, the electronic device 100 may display the 1-2-th image 95-2 displayed in the third area 900-3 in the second area 900-2 when receiving a user input for including the 1-2-th image 95-2 displayed in the third area 900-3 in the second area 900-2. The user input for including the 1-2-th image 95-2 in the second area 900-2 may be a user input for selecting the 1-2-th image 95-2 displayed in the third area 900-3, the present disclosure is not limited thereto, and this user input may be any of various user inputs such as the user input for selecting an icon displayed in the third area. FIG. 10 is a flowchart illustrating a control method for an electronic device according to the present disclosure.

An electronic device 100 may display a video in a first area of a display (S1010). For example, the video according to the present disclosure may be a lecture video provided by an e-learning system or the like. A video file in the electronic device 100 may be executed, and in this case, the electronic device 100 may display the executed video in the first area. However, the present disclosure is not limited thereto, and the electronic device 100 may receive the video from an external server in a streaming manner and display the same in the first area. In addition, the electronic device 100 may include a camera, and in this case, the electronic device 100 may display the video captured by the camera in the first area. However, the present disclosure is not limited thereto, and the electronic device 100 may acquire the video through various manners, and display the acquired video in the first area.

The electronic device 100 may then identify a writing area including at least one writing information in the video displayed in the first area (S1020). For example, the writing information may include writing information written directly by an instructor in the video through a blackboard, or the like, and writing information included in a display device in the video.

The electronic device 100 may then acquire a first image corresponding to the identified writing area and display the same in a second area of the display (S1030). In detail, the electronic device 100 may acquire first information in the writing area and generate the first image on the basis of the first information. The first information may include writing information included in the first writing area.

The electronic device 100 may then detect a change in at least a part of the writing information displayed in the writing area (S1040). For example, the change in the writing information may be a change of deleting at least a part of the writing information and adding new writing information to an area including the deletion.

The electronic device 100 may identify a type of a change when detecting the change (S1050). The type of a change may include at least one of a change to correct a simple typo, a change to intentionally explain a changed content, and a change including deletion to secure a writing area. In detail, the electronic device 100 identifies at least one of voice data and subtitle data, corresponding to the changed writing information, and identify the type of a change on the basis of at least one of the identified voice data and subtitle data, and at least one of a maintenance period of deleted writing information and a size of an area corresponding to the changed writing information.

The electronic device 100 may acquire a second image in which the first image is modified on the basis of the identified type of a change when identifying the type of a change (S1060).

For example, the electronic device 100 may generate the second image by replacing the writing information deleted from the first image with the added writing information when identifying the type of the change as the change to correct a simple typo.

For example, the electronic device 100 may generate the second image including all of the deleted writing information from the first image, an indicator indicating the deletion, and the added writing information when identifying the type of a change is the change to intentionally explain a changed content.

For example, the electronic device 100 may generate the second image including the first image and the added writing information when identifying the type of a change as the change including deletion to secure a writing area.

The electronic device 100 may display the acquired second image in the second area when the second image is acquired (S1070). However, the present disclosure is not limited thereto, and the electronic device 100 may display the second image in a third area for handwriting recommendation while displaying the first image in the second area. In addition, the electronic device 100 may change the first image displayed in the second area to the second image and display the same on the basis of a user input for including the second image in the second area.

Figure 11:
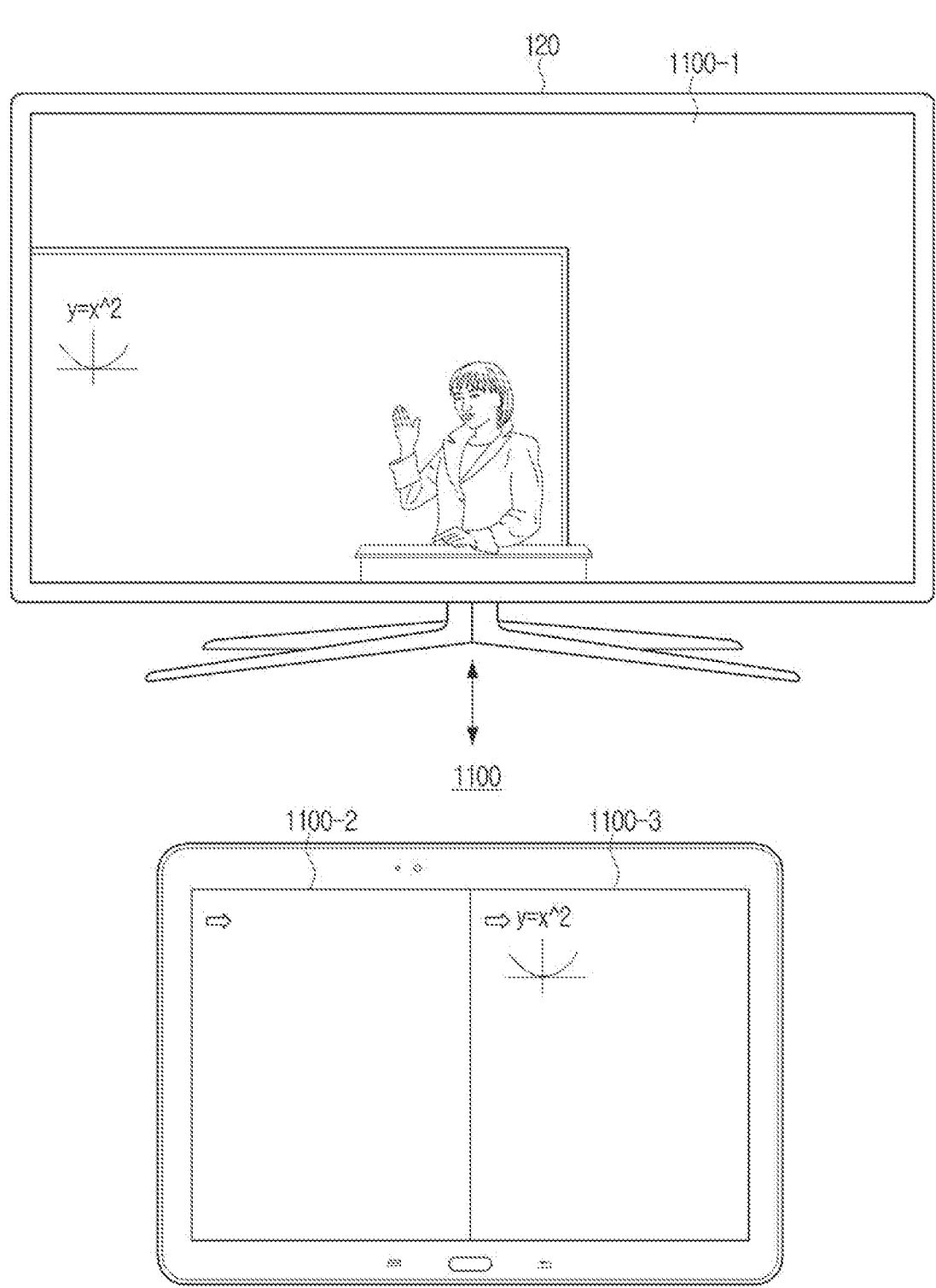
FIG. 11 is a view illustrating an example in which a video is displayed on the electronic device and the image corre-sponding to the writing area is displayed on an external device, according to an embodiment.

FIG. 11 is a view illustrating an example in which the video is displayed on the electronic device and the image corresponding to the writing area is displayed on the external device.

The above-mentioned drawings show that the video is displayed in the first area of the display 120 of the electronic device 100 and the image corresponding to the writing area is displayed in the second area, and the present disclosure is not limited thereto.

For example, as shown in FIG. 11, the electronic device 100 may display a video 1100-1 on the display 120 of the electronic device 100, and the external device 1100 may display an area 1100-2 for displaying the writing information and an area for recommending writing information 1100-3 on a display of the external device 1100.

That is, writing information may be added to the writing area in the video displayed on the display 120 of the electronic device 100. In this case, the electronic device 100 may transmit the image corresponding to the writing information to the external device 1100, and the external device 1100 may display the received image in the area 1100-2 of the external device 1100, for displaying writing information, or the area thereof for recommending writing information 1100-3.

Figure 12:
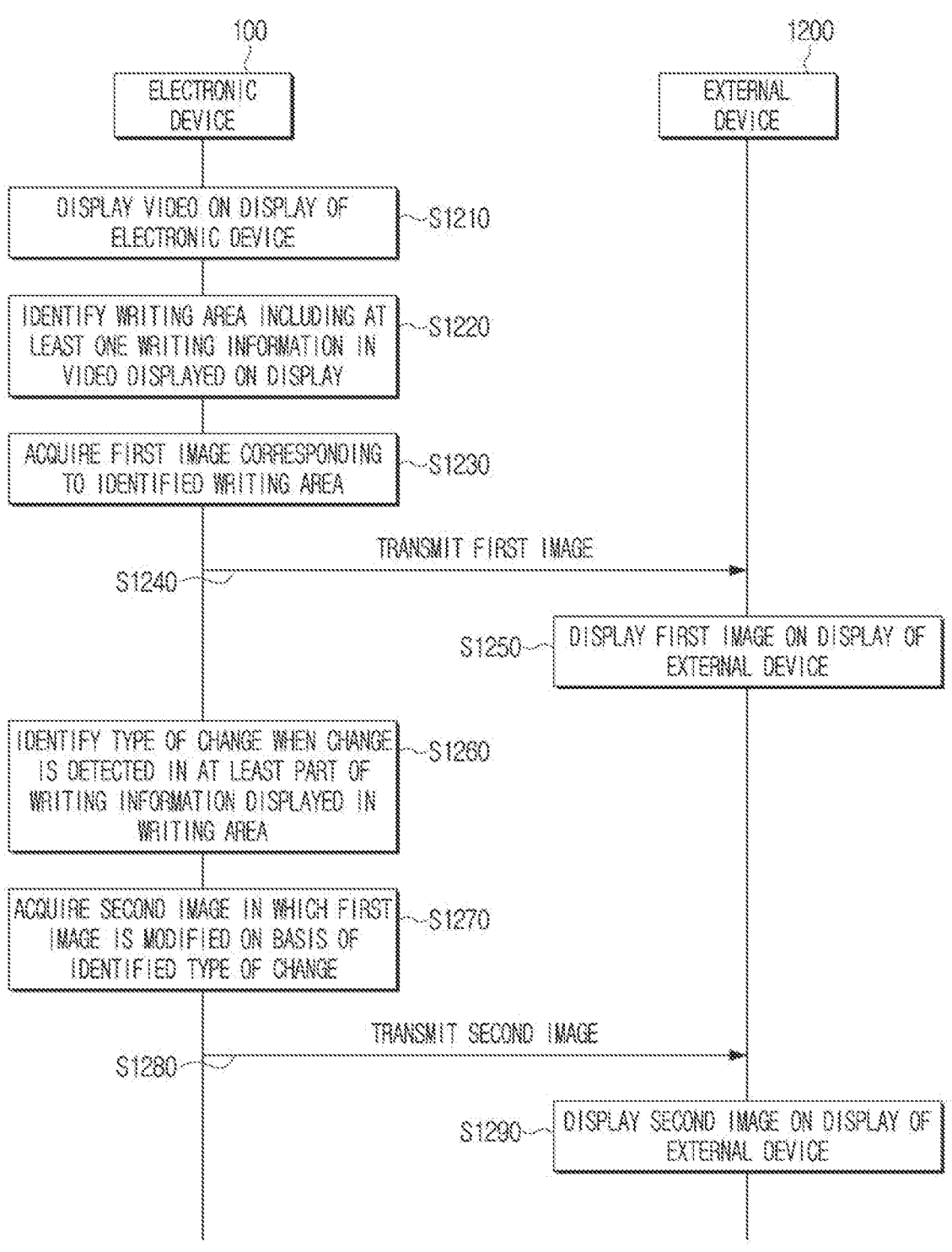
FIG. 12 is a sequence diagram illustrating an operation between the electronic device and the external device in the example of FIG. 11, according to an embodiment.

The description describes a method of performing an operation between the electronic device 100 and the external device 1100 according to the example of FIG. 11 with reference to FIG. 12.

FIG. 12 is a sequence diagram illustrating the operation between the electronic device and the external device in the example of FIG. 11.

Referring to FIG. 12, the electronic device 100 may display a video on the display of the electronic device 100 (S1210). For example, the electronic device 100 may display the video on an entire area of the display of the electronic device 100.

The electronic device 100 may then identify a writing area including at least one writing information in the video displayed on the display (S1220). For example, referring to FIG. 11, the electronic device 100 may identify, as the writing area, an area including "y=x^2" and a graph in the video 1100-1.

The electronic device 100 may then acquire a first image corresponding to the identified writing area (S1230). The electronic device 100 may transmit the first image to an external device 1200 when acquiring the first image (S1240).

The external device 1200 may display the first image on a display of the external device 1200 when the external device 1200 receives the first image from the electronic device 100 (S1250). In detail, the external device 1200 may display the first image in an area of the display, for displaying writing information or an area thereof, for recommending writing information. FIG. 11 shows that a display area of the external device 1100 is distinguished into the area 1100-2 for displaying writing information and the area 1100-3 for recommending writing information, the present disclosure is not limited thereto, and the external device 1200 can display the entire area of the display as the area for displaying writing information.

The electronic device 100 may then identify a type of a change when detecting the change in at least a part of the writing information displayed in the writing area in the video (S1260). The type of a change may include, for example, a change to correct a simple typo, a change to intentionally explain a changed content, and a change including deletion to secure a writing area.

The electronic device 100 may acquire a second image in which the first image is modified on the basis of the identified type of change when identifying the type of change (S1270). The second image may be an image to which a change is applied from the first image, and generated by modifying the first image based on the type of a change as described above with reference to the drawings.

The electronic device 100 may transmit the second image to the external device 1200 when acquiring the second image (S1280).

The external device 1200 may display the second image on the display of the external device 1200 when the external device 1200 receives the second image (S1290).

For example, the external device 1200 may change the first image being displayed as the second image and display the same.

For example, the external device 1200 may display the second image in the area for recommending writing information while displaying the first image in the area for displaying writing information when receiving the second image while the first image is displayed in the area for displaying writing information on the display of the external device 1200. The external device 1200 may then display the second image in the area for displaying writing information when receiving a user input for selecting the second image.

Figure 13:
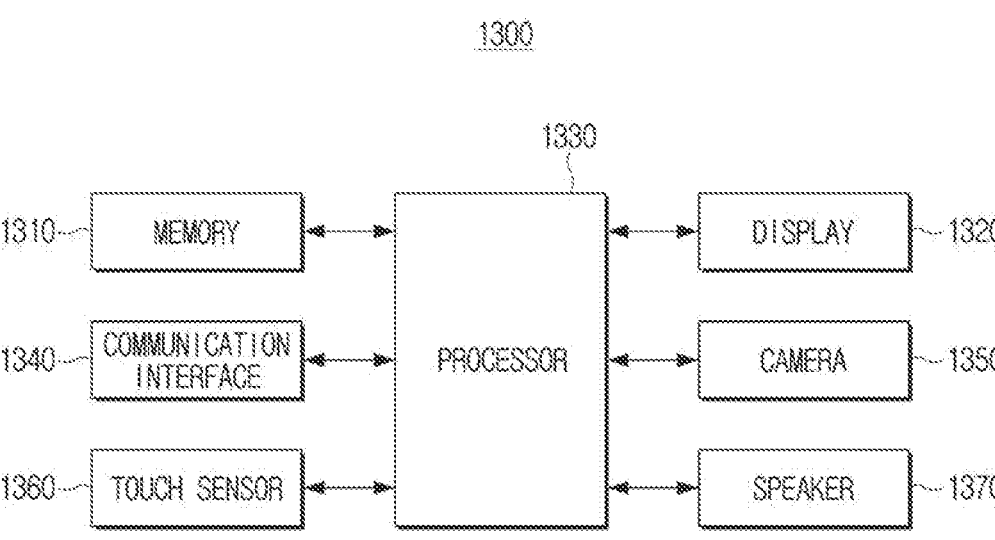
FIG. 13 is a block diagram illustrating a configuration of the electronic device according to an embodiment.

FIG. 13 is a block diagram illustrating a configuration of an electronic device according to an embodiment of the present disclosure.

As shown in FIG. 13, an electronic device 1300 according to an embodiment of the present disclosure may include a memory 1310, a display 1320 and a processor 1330, and further include a communication interface 1340, a camera 1350, and a touch sensor 1360 and a speaker 1370. However, this configuration is an example, and a new configuration may be added or some configuration may be omitted in addition to this configuration when the present disclosure is performed. The description already describes the memory 1310, the display 1320, and the processor 1330 with reference to FIG. 1, and only describes the communication interface 1340, the camera 1350, the touch sensor 1360 and the speaker 1370 hereinafter.

The communication interface 1340 is configured to communicate with various types of external devices by using various types of communication methods. The communication interface 1340 may include a wireless-fidelity (Wi-Fi) chip, a Bluetooth chip, a wireless communication chip or a near field communication (NFC) chip. The processor 1330 may perform communication with the various external devices using the communication interface 1340.

In an embodiment according to the present disclosure, the processor 1330 may perform a wireless connection with the external device which may be connected to the electronic device 1300 through the communication interface 1340. In particular, the Wi-Fi chip and the Bluetooth chip may perform the communication by using the Wi-Fi method and the Bluetooth method, respectively. In the case of using the Wi-Fi chip or the Bluetooth chip, various connection information such as a service set identifier (SSID), a session key, and the like, may first be transmitted and received, communication may then be connected using the connection information, and various information may then be transmitted and received. The wireless communication chip may be a chip performing the communication based on any of various communication protocols such as Institute of Electrical and Electronics Engineers (IEEE), Zigbee, $3^{rd}$ generation (3G), $3^{rd}$ generation partnership project (3GPP), long term evolution (LTE), and the like. The NFC chip may be a chip operated in an NFC manner using a band of 13.56 MHz among various radio frequency identification (RFID) frequency bands such as 135 kHz, 13.56 MHz, 433 MHz, 860 to 960 MHz, 2.45 GHz, and the like.

In an embodiment according to the present disclosure, the electronic device 1300 may receive the video from the external server in a streaming manner through the communication interface 1340.

The processor 1330 may then control the communication interface 1340 to generate an image corresponding to writing information on the basis of the video displayed on the display 1320, and transmit the generated image to the external device.

The camera 1350 may be disposed on one side of the electronic device 1300 and is configured to capture an image. Here, the electronic device 1000 may acquire a video capturing a lecture content of the instructor by using the camera 1350.

The touch sensor 1360 may detect a drawing input on the display 1320. The drawing input may be input to the electronic device 1300 by a user touch, and the user touch may include a touch input by a user finger and a touch input by an electronic pen.

In the case of the touch input by a user finger, the touch sensor 1360 may detect the touch input and output a touch event value corresponding to a detected touch signal. Here, information corresponding to the touch signal may be displayed on the display 1320.

In the case of the touch input by an electronic pen, the touch sensor 1360 may detect the proximity input or touch input of the electronic pen based on an operation of the electronic pen, and output the detected electronic pen-proximity event or electronic pen-contact event.

The speaker 1370 may output audio data under control of the processor 1330. In particular, in the various embodiments according to the present disclosure, the speaker 1370 may output the audio data included in the video.

The embodiments may be variously modified and have several examples, and the embodiments are thus shown in the drawings and described in detail in the detailed description. However, it is to be understood that the technology of the present disclosure is not limited to the embodiments, and include various changes (or modifications), equivalents and/or alternatives according to the embodiments of the present disclosure. Throughout the accompanying drawings, similar components are denoted by similar reference numerals.

In describing the present disclosure, when it is decided that a detailed description for the known functions or configurations related to the present disclosure may unnecessarily obscure the gist of the present disclosure, the detailed description thereof is omitted.

In addition, the embodiments described above may be modified in several different forms, and the scope and spirit of the present disclosure are not limited to the above-described embodiments. Rather, these embodiments are provided to make the present disclosure thorough and complete, and to completely transfer the spirit of the present disclosure to those skilled in the art.

The terms used in the present disclosure are used to describe the embodiments rather than limiting the scope of the present disclosure. The term of a singular number may include its plural number unless explicitly indicated otherwise in the context.

In the present disclosure, the expression "have," "may have," "include," "may include" or the like, indicates the existence of a corresponding feature (for example, a numerical value, a function, an operation or a component such as a part), and does not exclude the existence of an additional feature.

In the present disclosure, an expression "A or B," "least one of A and/or B," "one or more of A and/or B" or the like, may include all possible combinations of items enumerated together. For example, "A or B," "at least one of A and B" or "at least one of A or B" may indicate all of 1) a case where at least one A is included, 2) a case where at least one B is included or 3) a case where both of at least one A and at least one B are included.

The expressions "first," "second" and the like, used in the present disclosure, may indicate various components regardless of the sequence and/or importance of the components. These expressions are used only to distinguish one component from another component, and do not limit the corresponding component.

In case that any component (for example, a first component) is mentioned to be "(operatively or communicatively) coupled with/to" or "connected to" another component (for example, a second component), it is to be understood that any component is directly coupled to another component or coupled to another component through still another component (for example, a third component).

On the other hand, in case that any component (for example, the first component) is mentioned to be "directly coupled to" or "directly connected to" another component (for example, the second component), it is to be understood that still other component (for example, the third component) is not present between any component and another component.

The expression "configured (or set) to" used in the present disclosure may be replaced by an expression "suitable for," "having the capacity to," "designed to," "adapted to," "made to" or "capable of," for example, based on a situation. The expression "configured (or set) to" may not necessarily indicate "specifically designed to" in hardware.

Instead, the expression "a device configured to" in any situation may indicate that the device may "perform~" together with another device or component. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and implemented by at least one processor except for a "module" or an "~er/or" that needs to be implemented by specific hardware.

Meanwhile, the various elements and areas in the drawings are schematically illustrated. Therefore, the spirit of the present disclosure is not limited by relative sizes or intervals illustrated in the accompanying drawings.

Meanwhile, the various embodiments of the present disclosure described above may be implemented in a computer or a computer-readable recording medium by using software, hardware, or a combination of software and hardware. According to a hardware implementation, the embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the embodiments described in the present disclosure may be implemented by the processor itself. According to a software implementation, the embodiments such as procedures and functions described in the present disclosure may be implemented by separate software modules. Each of the software modules may perform one or more functions and operations described in the specification.

Meanwhile, the methods according to the various embodiments of the present disclosure described above may be stored in a non-transitory readable medium. The non-transitory readable medium may be mounted and used in various apparatuses.

The non-transitory readable medium is not a medium that temporarily stores data, such as a register, a cache, a memory or the like, and indicates a medium that semi-permanently stores data and is readable by an apparatus. In detail, programs for performing the various methods described above may be stored and provided in the non-transitory readable medium such as a compact disc (CD), a digital versatile disc (DVD), a hard disc, a blue-ray disc, a universal serial bus (USB), a memory card, a read only memory (ROM) or the like.

The method according to the various embodiments disclosed in the present disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least portions of the computer program product may be at least temporarily stored in a storage medium such as a memory of a server of a manufacturer, a server of an application store or a relay server, or be temporarily provided.

In addition, although the embodiments are shown and described in the present disclosure as above, the present disclosure is not limited to the above mentioned specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A control method for an electronic device, the control method comprising:

displaying a video in a first area of a display;

identifying a writing area including at least one writing information in the video displayed in the first area;

acquiring a first image corresponding to the identified writing area and displaying the first image in a second area of the display;

based on a change being detected in the at least one writing information, identifying at least one of voice data or subtitle data, corresponding to the changed writing information;

identifying a type of the change based on at least one of the identified at least one of the voice data or the subtitle data, and at least one of a maintenance period of a deleted writing information or a size of an area corresponding to the changed writing information; and acquiring a second image in which the first image is modified based on the identified type of the change and displaying the second image in the second area, wherein the identifying the writing area comprises identifying a first sub-writing area in the writing area, and identifying a second sub-writing area in the writing area based on the at least one writing information in the second sub-writing area being located at least a predetermined distance from the first sub-writing area, and wherein the acquiring the first image and displaying the first image in the second area of the display comprises sequentially displaying a first sub image corresponding to the first sub-writing area and a second sub image corresponding to the second sub-writing area, in the second area.

2. The control method of claim 1, wherein the change comprises adding new writing information to an area that includes the deleted writing information, and the type of the change includes at least one of correcting a typographical error, explaining a changed content, and deleting to secure the writing area.

3. The control method of claim 2, wherein the acquiring the second image and displaying the second image in the second area further comprises generating the second image by replacing the writing information deleted from the first image with the added new writing information based on the type of the change being identified as the change to correct the typographical error.

4. The control method of claim 2, wherein the acquiring the second image and displaying the second image in the second area further comprises generating the second image including the writing information deleted from the first image, an indicator indicating the deleted writing information, and the added new writing information based on the type of the change being identified as the change to explain the changed content.

5. The control method of claim 2, wherein the acquiring the second image and displaying the same in the second area further includes generating the second image including the first image and the added new writing information based on the type of the change being identified as the change to secure the writing area.

6. The control method of claim 1, wherein the acquiring the second image and displaying the second image in the second area further comprises:

displaying the second image in a third area for handwriting recommendation while displaying the first image in the second area; and changing the first image displayed in the second area to the second image and displaying the second image based on a user input for including the second image in the second area.

7. The control method of claim 1, wherein the acquiring the first image and displaying the first image in the second area of the display further comprises:

displaying the first sub image and the second sub image in a third area for handwriting recommendation; and displaying an image selected from the first sub image and the second sub image in the second area.

8. The control method of claim 1, further comprising performing a drawing function based on a user input for drawing being detected on the second image displayed in the second area.

9. An electronic device comprising:

a memory storing at least one instruction;

a display; and a processor configured to execute the at least one instruction to:

control the display to display a video in a first area of the display, identify a writing area including at least one writing information in the video displayed in the first area, acquire a first image corresponding to the identified writing area and control the display to display the first image in a second area of the display, based on detecting a change in the at least one writing information, identify at least one of voice data or subtitle data, corresponding to the changed writing information, identify a type of the change based on at least one of the identified at least one of the voice data or the subtitle data, and at least one of a maintenance period of a deleted writing information or a size of an area corresponding to the changed writing information, and acquire a second image in which the first image is modified based on the identified type of the change and control the display to display the second image in the second area, wherein the processor is further configured to execute the at least one instruction to:

identify the writing area by identifying a first sub-writing area in the writing area, and identifying a second sub-writing area in the writing area based on the at least one writing information in the second sub-writing area being located at least a predetermined distance from the first sub-writing area, and control the display to sequentially display a first sub image corresponding to the first sub-writing area and a second sub image corresponding to the second sub-writing area, in the second area.

10. The electronic device of claim 9, wherein the change comprises adding new writing information to an area that includes the deleted writing information, and the type of the change comprises at least one of correcting a typographical error, explaining a changed content, and deleting to secure the writing area.

11. The electronic device of claim 10, wherein the processor is further configured to execute the at least one instruction to generate the second image by replacing the writing information deleted from the first image with the added new writing information based on identifying the type of the change as the change to correct the typographical error.

12. The electronic device of claim 10, wherein the processor is further configured to execute the at least one instruction to generate the second image including the writing information deleted from the first image, an indicator indicating the deleted writing information, and the added new writing information based on identifying the type of the change as the change to explain the changed content.

\* \* \* \* \*